US012661591B2

(12) United States Patent
Sato et al.

(10) Patent No.: US 12,661,591 B2
(45) Date of Patent: Jun. 23, 2026

(54) GAME MACHINE, GAME SYSTEM, STORAGE MEDIUM USED IN SAME, AND CONTROL METHOD

(71) Applicant: KONAMI AMUSEMENT CO., LTD., Ichinomiya (JP)

(72) Inventors: Naoyuki Sato, Ichinomiya (JP); Yoshitaka Nishimura, Ichinomiya (JP); Shinya Ishida, Ichinomiya (JP); Yuto Nishino, Ichinomiya (JP)

(73) Assignee: KONAMI AMUSEMENT CO., LTD., Ichinomiya (JP)

( * ) Notice: Subject to any disclaimer, the term of this patent is extended or adjusted under 35 U.S.C. 154(b) by 314 days.

(21) Appl. No.: 18/486,454

(22) Filed: Oct. 13, 2023

(65) Prior Publication Data

US 2024/0033641 A1    Feb. 1, 2024

Related U.S. Application Data

(63) Continuation of application No. PCT/JP2022/017818, filed on Apr. 14, 2022.

(30) Foreign Application Priority Data

Apr. 16, 2021    (JP) ................................. 2021-069860

(51) Int. Cl.
*A63F 13/44*        (2014.01)
*A63F 13/352*       (2014.01)
(Continued)

(52) U.S. Cl.
CPC ............ *A63F 13/71* (2014.09); *A63F 13/352* (2014.09); *A63F 13/44* (2014.09); *A63F 13/46* (2014.09);
(Continued)

(58) Field of Classification Search
None
See application file for complete search history.

(56) References Cited

U.S. PATENT DOCUMENTS

2006/0160627 A1*    7/2006    Fujimori ................. A63F 13/77
                                                                    463/43
2007/0265095 A1*    11/2007   Jonishi .................... A63F 13/30
                                                                    463/42

FOREIGN PATENT DOCUMENTS

JP            4209657 B2        1/2009
JP            6683322 B2        4/2020

OTHER PUBLICATIONS

International Search Report dated Jun. 28, 2022 in International Application No. PCT/JP2022/017818.
(Continued)

*Primary Examiner* — Damon J Pierce
(74) *Attorney, Agent, or Firm* — Sughrue Mion, PLLC

(57)        ABSTRACT

Provided is a game machine in which pieces of music prepared in a music distribution service provided only to members can be utilized in game play. A game machine provides a music selection opportunity to select music for play, such that multiple pieces of music are included as options in a music distribution service, which is provided separately from music games as a service that distributes multiple pieces of music only to user terminal devices that have passed member authentication. In addition, the game machine acquires musical score data for play corresponding to music for play from a game distribution system connected via a network. Furthermore, the game machine acquires music data corresponding to music for play from a music distribution system connected via the network, such that a music game is provided according to the combination of the music data and the musical score data for play.

13 Claims, 17 Drawing Sheets

(51) Int. Cl.
    *A63F 13/46*        (2014.01)
    *A63F 13/71*        (2014.01)
    *A63F 13/79*        (2014.01)
    *A63F 13/814*      (2014.01)

(52) U.S. Cl.
    CPC ............ *A63F 13/79* (2014.09); *A63F 13/814*
           (2014.09); *A63F 2300/401* (2013.01); *A63F*
                        *2300/5546* (2013.01)

(56)             References Cited

OTHER PUBLICATIONS

Written Opinion dated Jun. 28, 2022 in International Application
No. PCT/JP2022/017818.
Japanese Office Action dated May 18, 2023 in Japanese Application
No. 2021-069860.

* cited by examiner

FIG. 2

Game distribution system

2A

DB1

10

Music distribution system

Figure 7:
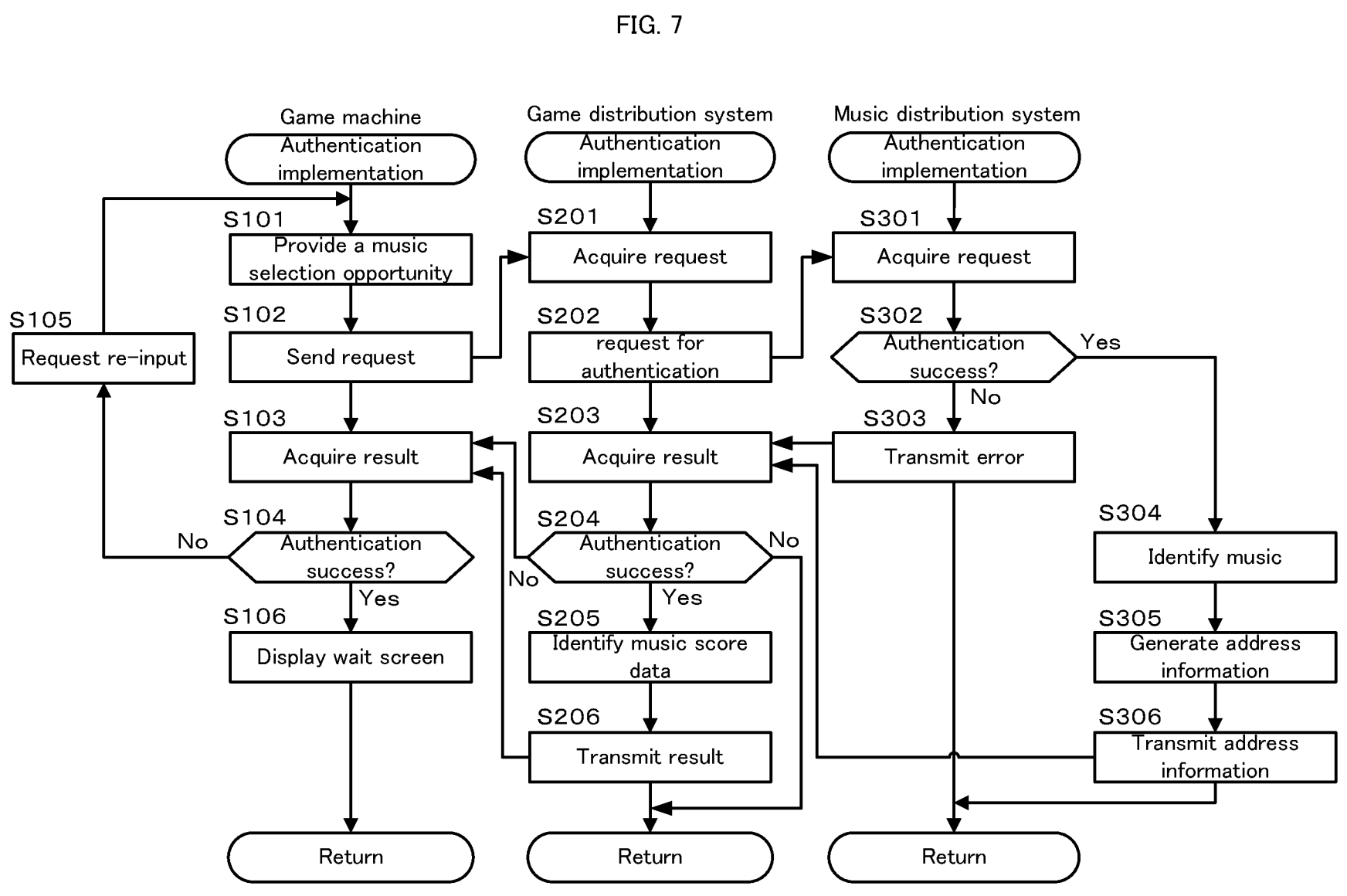

Music distribution system

Authentication implementation

S301 Acquire request

S302 Authentication success?
- Yes
- No

S303 Transmit error

S304 Identify music

S305 Generate address information

S306 Transmit address information

Return

Game distribution system

Authentication implementation

S201 Acquire request

S202 request for authentication

S203 Acquire result

S204 Authentication success?
- Yes
- No

S205 Identify music score data

S206 Transmit result

Return

Game machine

Authentication implementation

S101 Provide a music selection opportunity

S102 Send request

S103 Acquire result

S104 Authentication success?
- Yes
- No

S106 Display wait screen

S105 Request re-input

Return

FIG. 8

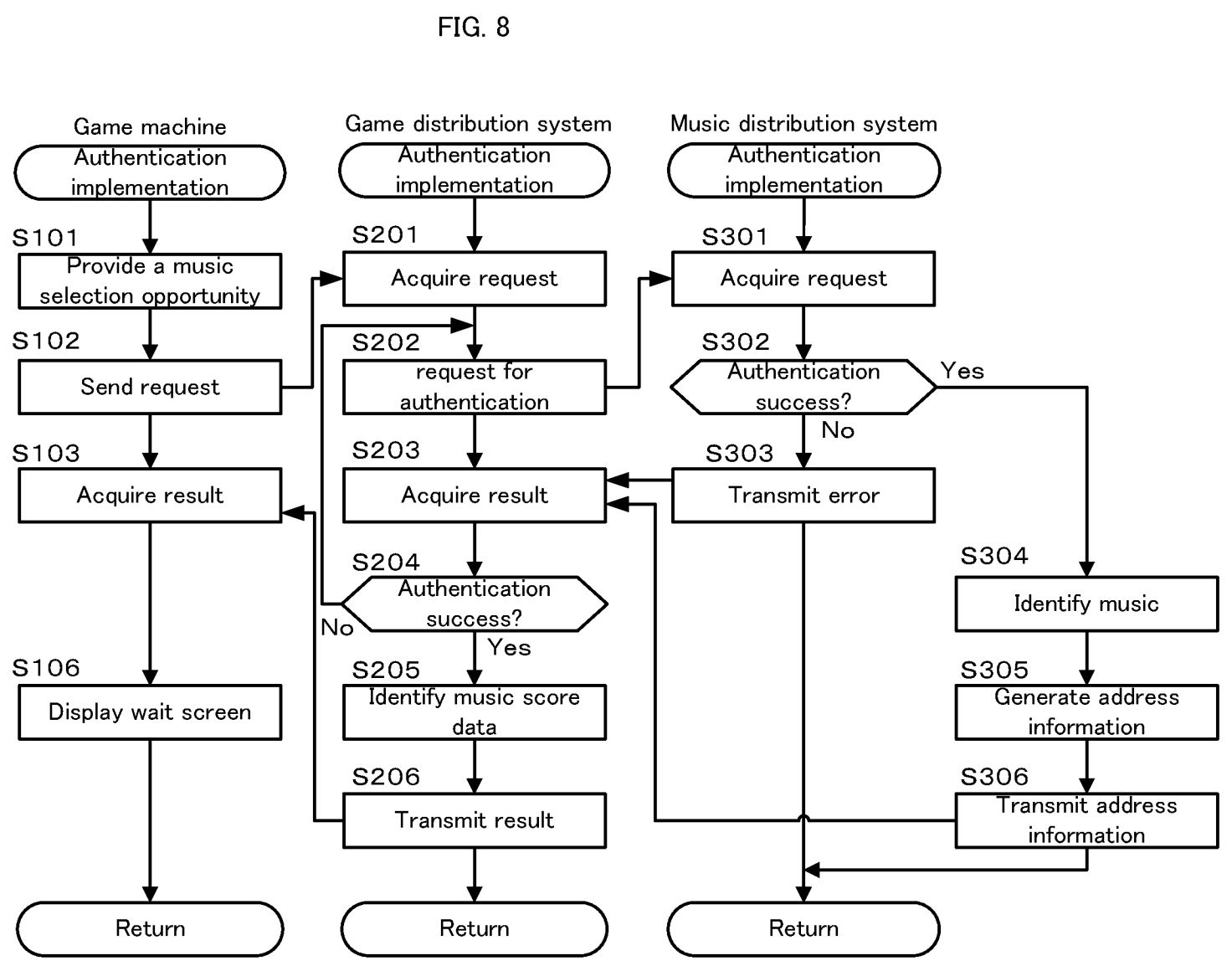

Game machine

Authentication implementation

S101 Provide a music selection opportunity

S102 Send request

S103 Acquire result

S106 Display wait screen

Return

Game distribution system

Authentication implementation

S201 Acquire request

S202 request for authentication

S203 Acquire result

S204 Authentication success?
Yes
No

S205 Identify music score data

S206 Transmit result

Return

Music distribution system

Authentication implementation

S301 Acquire request

S302 Authentication success?
Yes
No

S303 Transmit error

S304 Identify music

S305 Generate address information

S306 Transmit address information

Return

FIG. 10

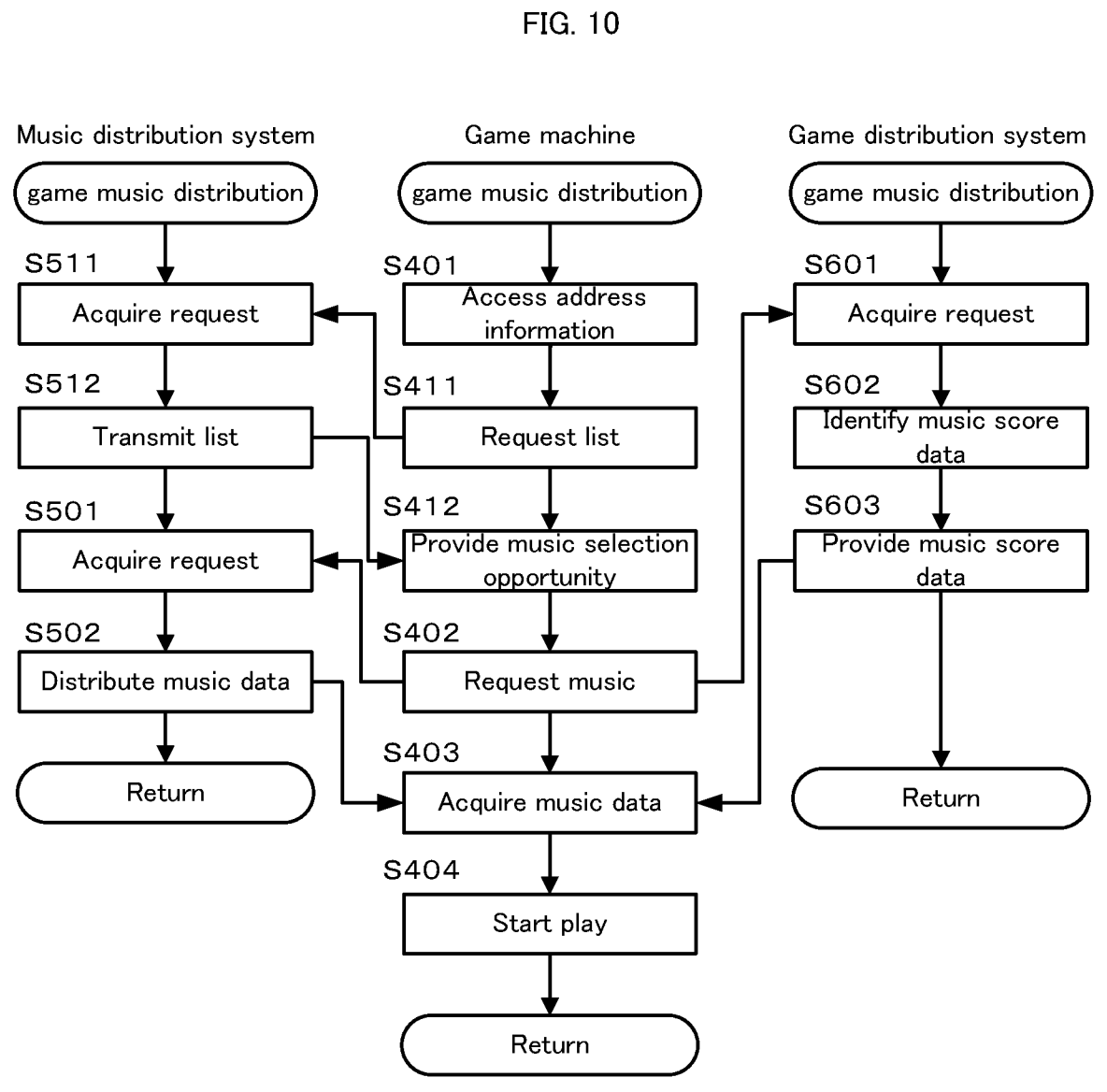

Music distribution system ( game music distribution )

S511  Acquire request

S512  Transmit list

S501  Acquire request

S502  Distribute music data

Return

Game machine ( game music distribution )

S401  Access address information

S411  Request list

S412  Provide music selection opportunity

S402  Request music

S403  Acquire music data

S404  Start play

Return

Game distribution system ( game music distribution )

S601  Acquire request

S602  Identify music score data

S603  Provide music score data

Return

FIG. 13

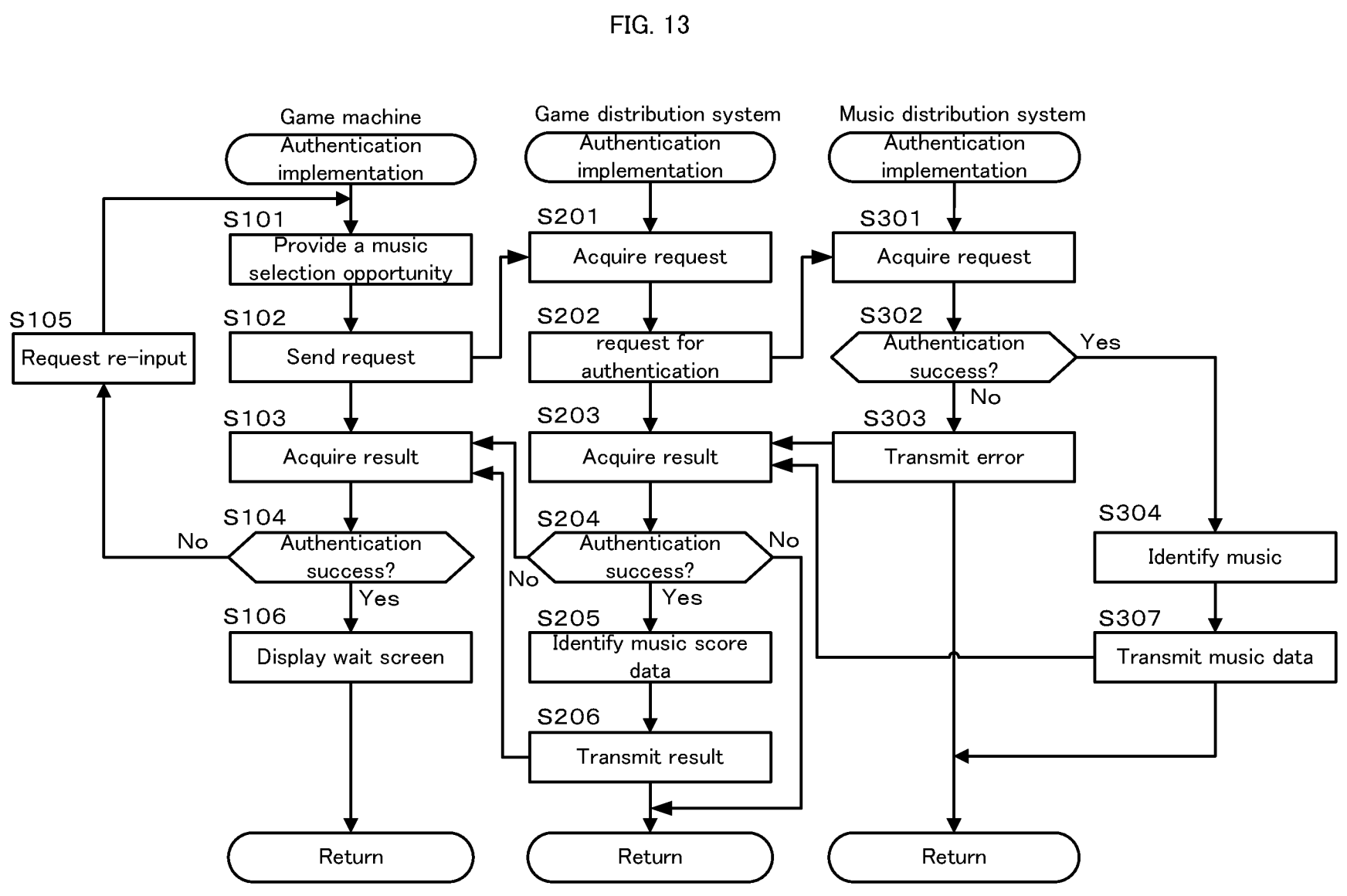

Music distribution system

Authentication implementation

S301 Acquire request

S302 Authentication success? — Yes / No

Yes → S304 Identify music → S307 Transmit music data → Return

No → S303 Transmit error → Return

Game distribution system

Authentication implementation

S201 Acquire request

S202 request for authentication

S203 Acquire result

S204 Authentication success? — Yes / No

Yes → S205 Identify music score data → S206 Transmit result → Return

No → Return

Game machine

Authentication implementation

S101 Provide a music selection opportunity

S102 Send request

S103 Acquire result

S104 Authentication success? — Yes / No

Yes → S106 Display wait screen → Return

No → S105 Request re-input

Figure 17:
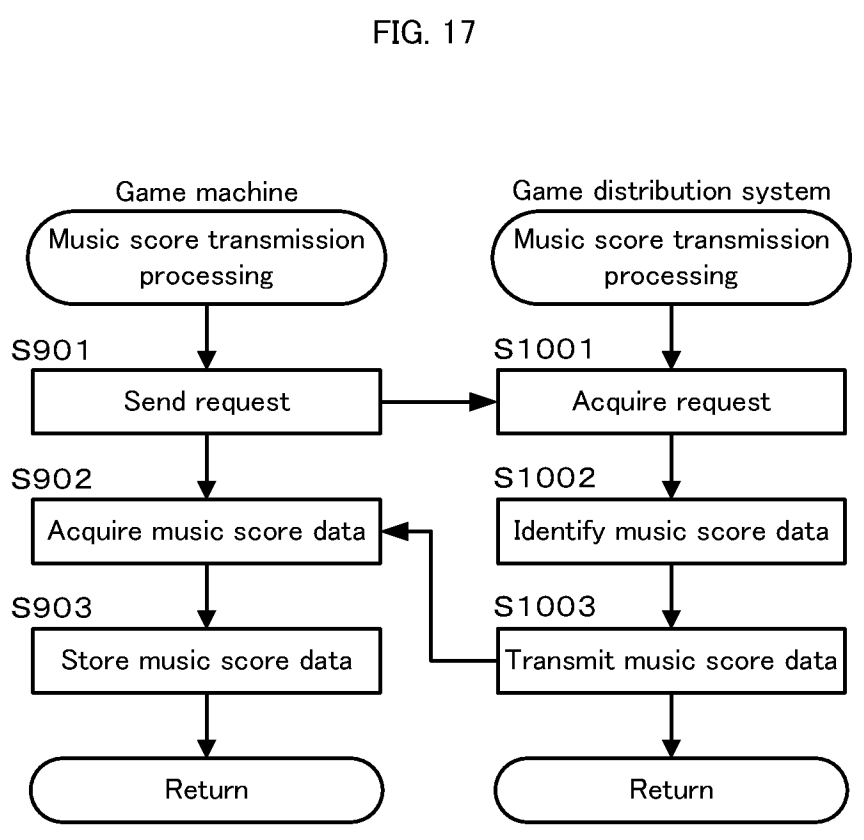

Game machine

Music score transmission processing

S901   Send request

S902   Acquire music score data

S903   Store music score data

Return

Game distribution system

Music score transmission processing

S1001   Acquire request

S1002   Identify music score data

S1003   Transmit music score data

Return

GAME MACHINE, GAME SYSTEM, STORAGE MEDIUM USED IN SAME, AND CONTROL METHOD

BACKGROUND OF THE INVENTION

Field of the Invention

The present invention relates to a game machine and the like that provide a game in which, based on music score data describing each execution timing at which a play action of a user is to be executed, a guide on each execution timing is given in rhythm with a piece of music for play and timings of actual play actions executed by the user are judged.

Description of the Related Art

There is a game machine that provides a game in which, based on music score data describing each execution timing at which a play action of a user is to be executed, a guide on each execution timing is given in rhythm with a piece of music for play and timings of actual play actions executed by the user are judged. There has been known a game machine that provides a music game as such a game (for example, see Patent Literature 1). Besides, Patent Literature 2 is another related-art literature related to the present invention.

CITATION LIST

Patent Literature

Patent Literature 1
  JP6683322B
Patent Literature 2
  JP4209657B

SUMMARY OF THE INVENTION

Technical Problem

According to a game machine of Patent Literature 1, music data for reproducing a piece of music is stored in the game machine. On the other hand, in a music game provided by a game machine as in Patent Literature 1, it is highly likely that interest of the game is affected by a piece of music used for play. Accordingly, a large number of pieces of music are prepared for play in many cases, and replacement of such pieces of music is frequent also in many cases. However, introduction of a new piece of music generally requires a contract with the right holder of the piece of music. To introduce many pieces of music, it is inevitably necessary to negotiate with many right holders individually, which requires much time and efforts.

Patent Literature 2 discloses a distribution system that distributes music data (a program content) to audio equipment via a network and causes the audio equipment to reproduce a piece of music based on the music data. There is also a music distribution service that distributes such music data to various user terminal devices via a network. In general, a large number of pieces of music are prepared in such services. Moreover, in some cases, such a music distribution service is provided as a subscription service in such a manner as to allow reproduction of unlimited pieces of music in exchange for a consideration corresponding to a certain period. In subscription services, membership registration is generally required for consideration payment, and after membership registration, the service can be used through predetermined member authentication. However, such a music distribution service is used simply for the purpose of reproducing pieces of music, in many cases. There is, therefore, room to utilize each piece of music distributed in the music distribution service for game play.

Accordingly, an object of the present invention is to provide a game machine and the like that can utilize, for game play, each piece of music prepared in a music distribution service provided exclusively to members.

Solution to Problem

The game machine of the present invention is a game machine comprising a computer that provides a game in which, based on music score data describing each execution timing at which a play action of a user is to be executed, a guide on each execution timing is given in rhythm with a piece of music for play and timings of actual play actions executed by the user are judged, wherein the computer serves as: an opportunity provision device configured to provide a music selection opportunity for selecting the piece of music for play in such a manner that a plurality of pieces of music in a music distribution service is included as options, the music distribution service provided separately from the game as a service of distributing the plurality of pieces of music exclusively to a user terminal device after member authentication using a member ID unique to each member; a music score acquisition device connected to a music score data server via a network and configured to acquire music score data for play from the music score data server, the music score data server storing the music score data for play as music score data corresponding to the piece of music for play, among a plurality of pieces of the music score data prepared in such a manner as to correspond to the plurality of pieces of music, respectively, as the music score data corresponding to each piece of music; and a music acquisition device connected to a music data server via the network and configured to acquire music data for play from the music data server such that giving of the guide on each execution timing in rhythm with the piece of music for play and judgement are performed based on a combination of the music data for play and the music score data for play, the music data server storing the music data for play as music data corresponding to the piece of music for play, among a plurality of pieces of the music data for reproducing the plurality of piece of music, respectively.

The non-transitory computer readable storage medium of the present invention is a non-transitory computer readable storage medium storing computer program configured to cause a computer to function as each device of the game machine described above.

The control method of the present invention is a control method executed by a computer incorporated in a game machine that provides a game in which, based on music score data describing each execution timing at which a play action of a user is to be executed, a guide on each execution timing is given in rhythm with a piece of music for play and timings of actual play actions executed by the user are judged, wherein the control method comprises: an opportunity provision procedure that provides a music selection opportunity for selecting the piece of music for play in such a manner that a plurality of pieces of music in a music distribution service is included as options, the music distribution service provided separately from the game as a service of distributing the plurality of pieces of music exclusively to a user terminal device after member authentication using a member ID unique to each member; a music score acquisition procedure that is connected to a music score data server via a network and acquires music score data for play from the music score data server, the music score data server storing the music score data for play as music score data corresponding to the piece of music for play, among a plurality of pieces of the music score data prepared in such a manner as to correspond to the plurality of pieces of music, respectively, as the music score data corresponding to each piece of music; and a music acquisition procedure that is connected to a music data server via the network and acquires music data for play from the music data server such that giving of the guide on each execution timing in rhythm with the piece of music for play and judgement are performed based on a combination of the music data for play and the music score data for play, the music data server storing the music data for play as music data corresponding to the piece of music for play, among a plurality of pieces of the music data for reproducing the plurality of piece of music, respectively.

The game system of the present invention is a game system, comprising a server device connected to the game machine described above via a network, wherein the server device is configured to function as the music score data server. And, the computer program of the present invention is a computer program configured to cause a computer incorporated in the server device to function as each device of the game system described above.

BRIEF DESCRIPTION OF THE DRAWINGS

FIG. 2 shows an outline of each system constructed in the game system in order to provide a music game service.

FIG. 3 is a functional block diagram showing essential parts of a control system of the game system.

FIG. 5 is an explanatory diagram for describing a flow of the music game service in a provision procedure according to a first embodiment.

FIG. 7 is a flowchart showing an example of a procedure for authentication implementation processing according to the first embodiment.

FIG. 8 is a flowchart showing another example of the procedure for the authentication implementation processing according to the first embodiment.

FIG. 10 is a flowchart showing another example of the procedure for the game music processing according to the first embodiment.

FIG. 13 is a flowchart showing an example of a procedure for authentication implementation processing according to the second embodiment.

FIG. 15 is an explanatory diagram for describing a flow of the music game service in a provision procedure according to a third embodiment.

FIG. 17 is a flowchart showing an example of a procedure for music score transmission processing.

DESCRIPTION OF THE EMBODIMENTS

Figure 1:
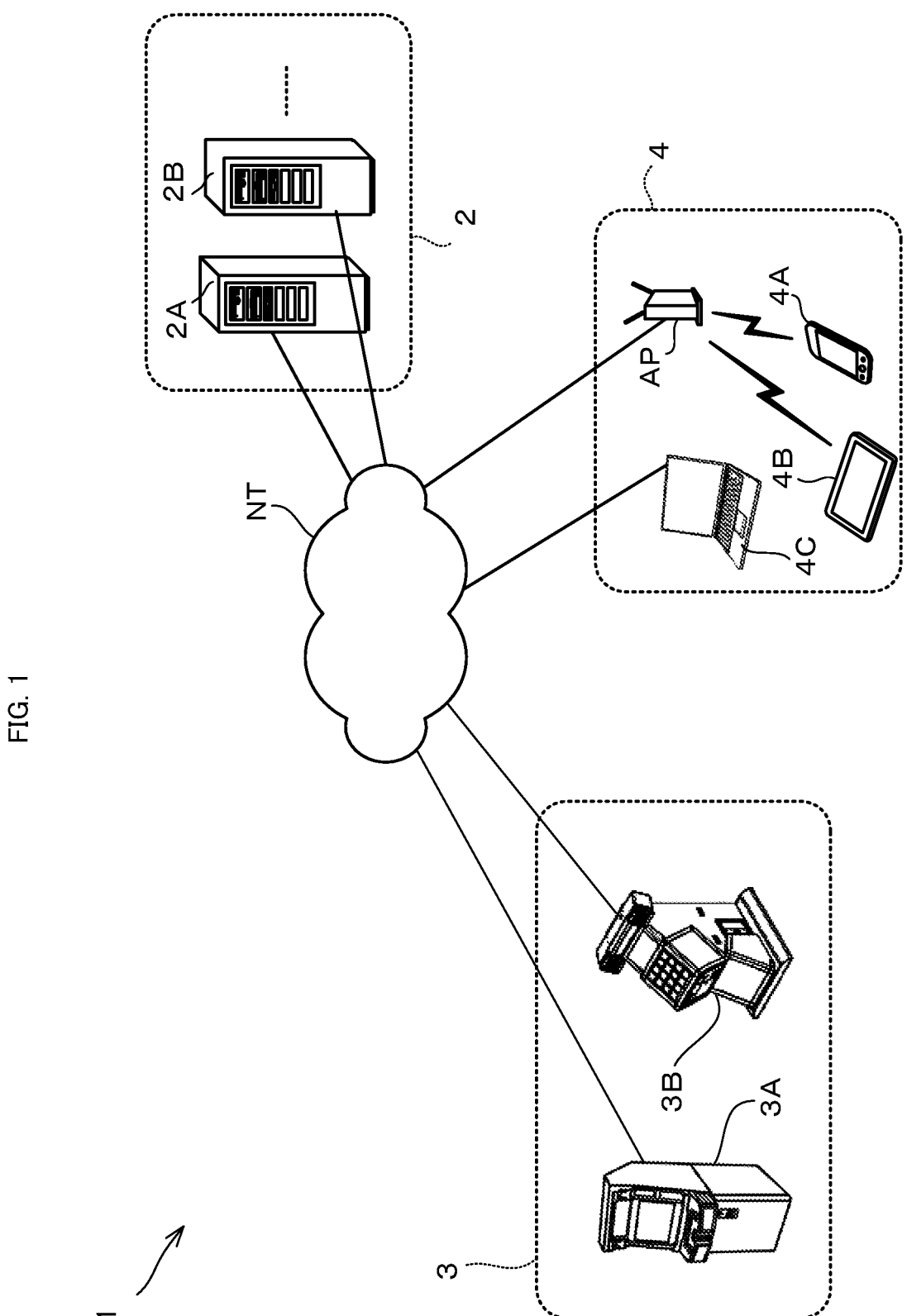
FIG. 1 shows an example of an entire configuration of a game system according to an embodiment of the present invention.

Hereinafter, an embodiment of a game system of the present invention is described. First, an entire configuration of the game system according to the embodiment of the present invention is described with reference to FIG. 1. As shown in FIG. 1, the game system 1 includes a server 2. The server 2 may be configured as appropriate and, for example, may be configured by using a single server unit (server device). As an example, the server 2 is configured by using server units. Specifically, the server 2 is configured as a logical server system in which a plurality of server units 2A, 2A . . . (hereinafter, represented by a reference sign "2" in some cases) is combined. The server units 2 may be collectively installed at a specific location on a network NT, or may be provided in such a manner as to configure a so-called cloud server system by being installed in a distributed manner over the network NT by using cloud computing. Game machines 3 and user terminal devices 4 are connected to the server 2 via the network NT as appropriate.

Each game machine 3 is a game device that provides a game to a user. The game machines 3 may include various game devices (computer devices) that provide games and, for example, may include a user terminal device 4 when the user terminal device 4 provides a game. In the example in FIG. 1, game machines 3A and 3B are illustrated. Each of the game machines 3A and 3B is an example of a game device. The game machines 3A, 3B are installed in a facility such as an amusement shop and are configured as commercial game machines (devices) that allow a user (hereinafter, a user playing a game is referred to as a player in some cases) to play the game in exchange for a predetermined consideration collected (consumed). Such a type of game machine is also referred to as an arcade game machine in some cases. Incidentally, the game machines 3 are not limited to an embodiment that includes a plurality of types of game devices, but may be configured, for example, by using only any one type of game devices.

A game machine 3 provides a music game. The music game is a type of timing game. The timing game is a type of game that judges execution timings of appropriate play actions. In a case of the music game, execution timings at which such appropriate play actions should be executed are provided along with a piece of music. In the music game, timings that match the rhythm of music are used for execution timings. In other words, the music game is a type of game that gives a user, in rhythm with a piece of music, guides on timings at which appropriate play actions should be executed, and judges timings at which actual play actions are executed. For the music game, a plurality of pieces of music is prepared for play, and a piece of music selected therefrom is used in actual play.

Each user terminal device 4 is an example of a computer device that is capable of connecting to a network and is for the personal use of (used individually by) a user. For such a user terminal device 4, for example, a mobile terminal device 4A such as a mobile telephone (including a smartphone), a portable tablet terminal device 4B, or a desktop or notebook personal computer 4C is used. Each user terminal device 4 provides various services, such as a game, upon execution of software (an application), and such services include a music reproduction service for reproducing a piece of music based on music data. In other words, upon execution of a predetermined application, each user terminal device 4 functions as a music reproduction terminal for reproducing various music. Such an application may be provided to each user terminal device 4 as appropriate. For example, an application may be provided from the server 2 via the network NT, or may be provided via a recording medium or the like. Incidentally, besides the above, various computer devices that are capable of connecting to a network and are for the personal use of users, such as a stationary home-use game console, a portable game console, and a portable tablet terminal device, may be used for user terminal devices 4.

The network NT may be configured as appropriate as long as the network NT can communicably connect the game machines 3 and the user terminal devices 4 to the server 2. As an example, the network NT includes the Internet as a WAN and any of various connection equipment, devices and the like, such as a LAN or an access point AP, that connect each of the server 2, the game machines 3, and the user terminal devices 4 to the Internet.

The server 2 provides various web services to the user terminal devices 4 or users thereof. As an example, the web services includes a music distribution service, although the web services may include various services for the user terminal devices 4 as appropriate. The music distribution service is a service for distributing a piece of music (music data) to a user terminal device 4 as a music reproduction terminal and allowing the piece of music to be heard. A large number of pieces of music are prepared in the music distribution service. Incidentally, besides the above, the web services may include services as appropriate, for example, a game information service for providing various information related to a game provided by a game machine 3, a distribution service for distributing various data or software (including updating the data or the like) to each user terminal device 4, a community service for providing a forum where users deliver, exchange, and share information, a service for giving a user ID for identifying each user, and the like.

Moreover, the server 2 provides various game machine services to the game machines 3 or users thereof. As an example, the game machine services include a music game service, although the game machine services can include various services for the game machines 3 as appropriate. The music game service is a service for allowing a user of a game machine 3 to play a music game using the music distribution service. Details of the music game service will be described later. Incidentally, besides the above, the game machine services may include, for example, a distribution service for distributing or updating a program or data for a game machine 3 via the network NT, a service for receiving identification information on a user and authenticating the user, a matching service for matching a plurality of users when the users play a common game via the network NT, a billing service for collecting fees from users, or the like as appropriate.

Figure 2:
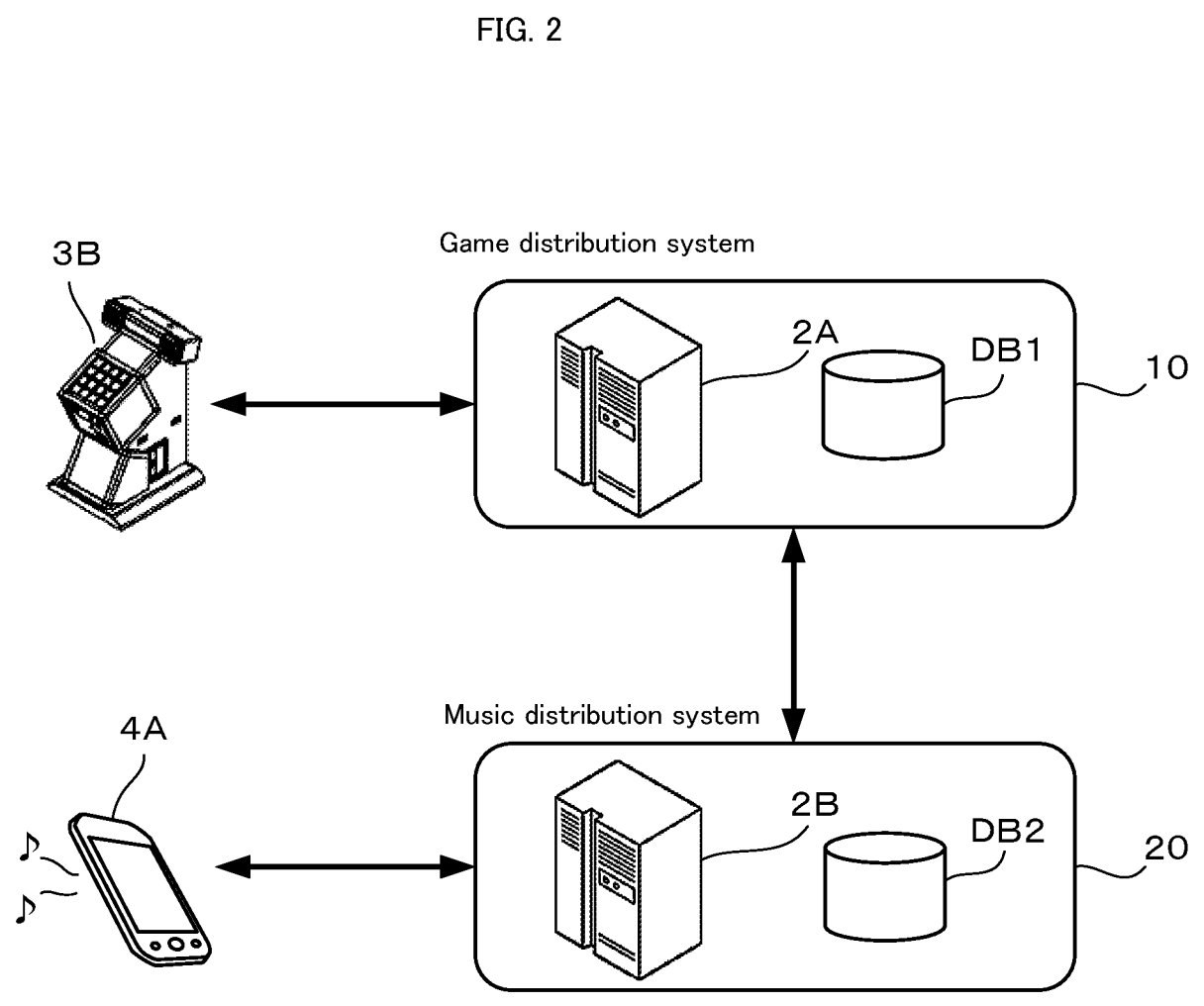

Next, an outline of an example of each system constructed in the game system 1 in order to provide the music game service is described with reference to FIG. 2. The game system 1 may be constructed by using a single system, or may include a plurality of systems. As an example, the game system 1 is constructed in such a manner as to include two systems, a game distribution system 10 and a music distribution system 20. Hereinafter, a case is described where the game machine 3B representing the game machines 3 and the mobile terminal device 4A representing the user terminal devices 4 are used.

The above-described web services and game machine services may be divided between the game distribution system 10 and the music distribution system 20 as appropriate. As an example, among the web services and the game machine services, the music distribution system 20 is in charge of the music distribution service, and the game distribution system 10 is in charge of various services related to the music game. However, since the music game service relates to both the music distribution service and the music game, both the game distribution system 10 and the music distribution system 20 share the music game service in such a manner as to perform appropriate part thereof.

As an example, the game distribution system 10 and the music distribution system 20 are constructed and operated by different operators, although the systems may be constructed and operated by the same operator. Accordingly, as an example, the music game service and the music distribution service are provided as mutually independent services, although one of the services may function as part of the other service. In other words, the game distribution system 10 and the music distribution system 20 are operated by different operators, and the music distribution service is provided as an independent service separately from the music game provided by the game machine 3B.

Although the music distribution service may be provided to each mobile terminal device 4A (or a user thereof) without restriction at the request of each user, the music distribution system 20, as an example, provides the music distribution service exclusively to a user who has registered for membership (hereinafter, referred to as a member in some cases). Accordingly, the music distribution service also includes various services for membership registration.

In membership registration, the music distribution system 20 may request that a member register (set) various information as membership information required to manage each member, and such membership information includes, for example, a member ID and a password. The member ID is a unique ID to each member to identify the member. The password is information for authenticating each member. As an example, the member ID is issued by the music distribution system 20 and the password is set by each user, although the member ID and the password may be set as appropriate and both may be issued by the music distribution system 20. After membership registration, the music distribution service is provided to each member (or a user terminal device 4 used by each member) through member authentication using the member ID and the password.

As an example, the music distribution service includes a listing function of picking up and listing some pieces of music among many pieces of music prepared in the music distribution service, although the music distribution service may include various functions as appropriate. As an example, the listing function creates at least any one of a play list and a preference list, although various lists may be created as appropriate. The play list is a list created by each member picking up favorite pieces of music and the like from among pieces of music for distribution. The preference list is a list created by the music distribution service picking up pieces of music and the like based on preferences of each member according to a usage record (distribution record) of the member. In the music distribution service, such lists are utilized by each member.

Each of the game distribution system 10 and the music distribution system 20 is implemented by using each server unit 2 as appropriate. Specifically, the music distribution system 20 includes, for example, the server unit 2B for music distribution and a database DB2 for music distribution. The database DB2 for music distribution is a server unit 2 for storing various data related to the music distribution service. Such data includes a plurality of pieces of music data for reproducing a plurality of pieces of music, respectively. The server unit 2B for music distribution is a server unit 2 that executes various processing for providing the music distribution service to the mobile terminal device 4A while using the database DB2 for music distribution. Such processing includes, for example, processing of implementing membership registration, processing of performing member authentication, and processing of distributing a piece of music (music data).

The game distribution system 10 includes, for example, the server unit 2A for game distribution and a game distribution database DB1. The game distribution database DB1 is a server unit 2 for storing various data related to the music game. The server unit 2A for game distribution is a server unit 2 that executes various processing for providing various services related to the music game to the game machine 3B or the like while using the game distribution database DB1. The game distribution system 10 provides, for example, the music game service while using such server unit 2A for game distribution and game distribution database DB1.

Figure 3:
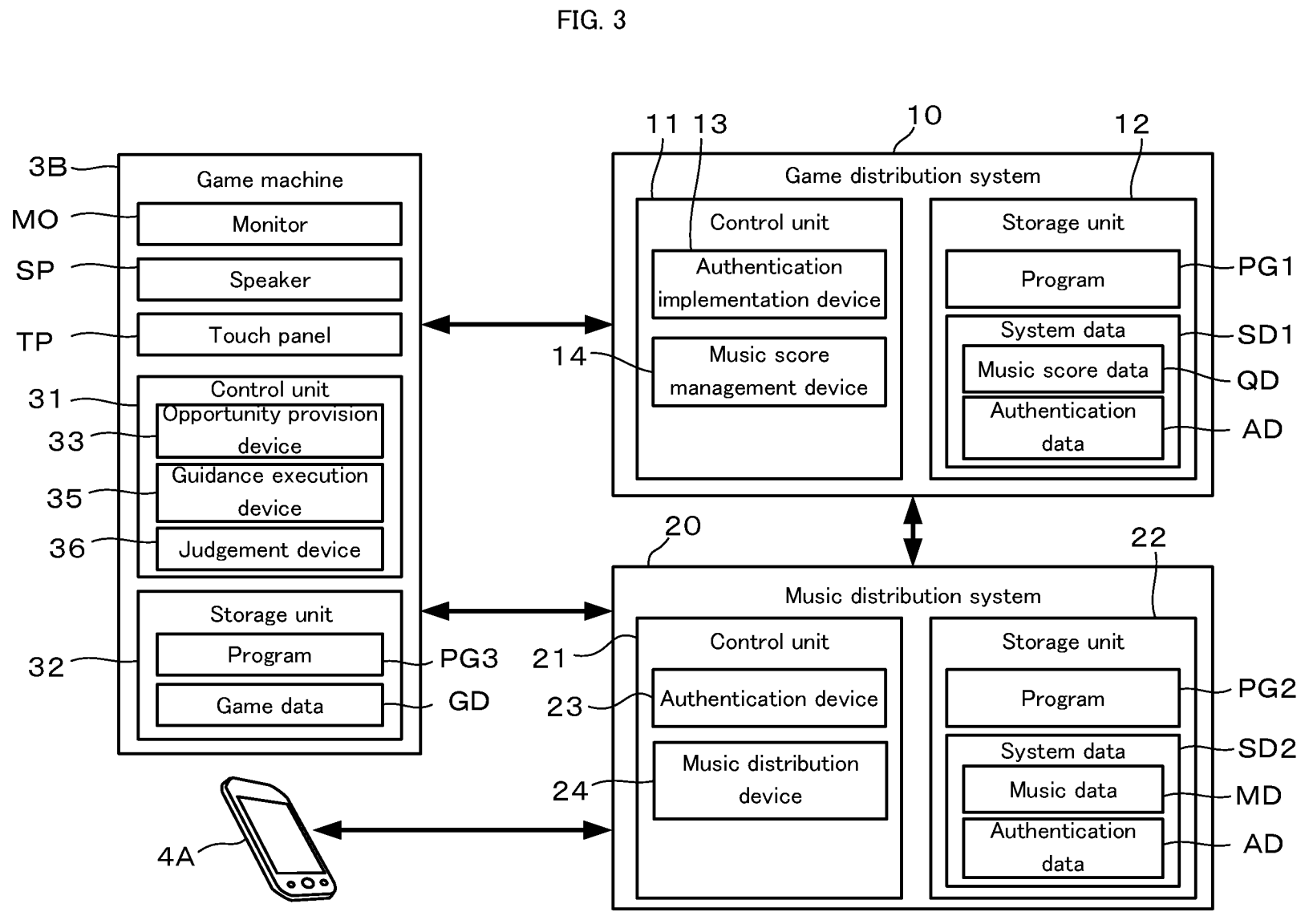

Next, in the game system 1, configurations of essential parts of a control system related to the music game service are described with reference to FIG. 3. FIG. 3 is a functional block diagram showing the essential parts of the control system of the game system 1 when the music game service is provided. As shown in FIG. 3, the game distribution system 10 includes a control unit 11 and a storage unit 12. The storage unit 12 is configured by using a storage unit including a non-transitory storage medium (computer-readable storage medium), such as a hard disk array. The storage unit 12 stores a program (computer program) PG1 and system data SD1 to be referred to by the control unit 11.

In the system data SD1, music score data QD and authentication data AD are shown in the example in FIG. 3, although various data required to provide the music game service can be included as appropriate. The music score data QD is data that describes each execution timing at which an appropriate play action should be executed in the music game. The music score data QD is used to give a guide on each execution timing and to judge each play action. When not only each piece of music in the music distribution service but other various pieces of music can also be played for the music game, the system data SD1 includes music score data QD corresponding to such various pieces of music. The authentication data AD is data for managing membership information required for member authentication in the music distribution service. Details of the authentication data AD will be described later. Incidentally, besides the above, the system data SD1 may also include various data, such as music data MD, as appropriate.

The control unit 11 is configured by using a computer hardware resource (for example, a CPU) of one or more server units 2. In the control unit 11, various logical devices related to the music game service can be configured by combining the hardware resource included in the control unit 11 and the program PG1. In the example in FIG. 3, an authentication implementation device 13 and a music score management device 14 are provided as such logical devices.

The authentication implementation device 13 is a logical device that executes processing for implementing member authentication to use the music distribution service provided by the music distribution system 20. As examples of such processing, the authentication implementation device 13 executes authentication implementation processing and data generation processing, although the processing includes various processing related to member authentication as appropriate. Similarly, as examples of such processing, the authentication implementation device 13 may execute game music distribution processing and music score transmission processing in some cases, depending on an embodiment, which will be described later. Details of procedures for the authentication implementation processing, the data generation processing, the game music distribution processing, and the music score transmission processing will be described later.

The music score management device 14 is a logical device that executes processing for managing the music score data QD. Such processing includes various processing related to management of the music score data QD as appropriate. For example, the music score data QD may be generated by a user through a user terminal device 4, in which case the processing includes processing of acquiring, from the user terminal device 4, and storing the music score data QD.

The music distribution system 20 includes a control unit 21 and a storage unit 22. The storage unit 22 is configured by using a storage unit including a non-transitory storage medium (computer-readable storage medium), such as a hard disk array. The storage unit 22 stores a program (computer program) PG2 and system data SD2 to be referred to by the control unit 21.

In the system data SD2, music data MD and authentication data AD are shown in the example in FIG. 3, although various data required to provide the music distribution service can be included as appropriate. The authentication data AD is as described above, and membership information on each member is described in the authentication data AD. However, the authentication data AD managed by the game distribution system 10 and the authentication data AD managed by the music distribution system 20 may have different contents (described information) in some cases, depending on an embodiment, which will be described later.

The control unit 21 is configured by using a computer hardware resource (for example, a CPU) of one or more server units 2. In the control unit 21, various logical devices are configured by combining the hardware resource included in the control unit 21 and the program PG2. In the example in FIG. 3, an authentication device 23 and a music distribution device 24 are provided as such logical devices.

The authentication device 23 is a logical device that executes processing for performing member authentication to provide the music distribution service. For example, the authentication device 23 executes the above-mentioned authentication implementation processing in cooperation with the authentication implementation device 13 of the game distribution system 10, although the authentication device 23 can execute various processing for member authentication as appropriate. The music distribution device 24 is a logical device that executes various processing for distributing pieces of music to members. For example, such processing includes processing of distributing a piece of music to the mobile terminal device 4A used by a member and distributing a piece of music to the game machine 3B that uses the music game service. For example, the music distribution device 24 executes the above-mentioned game music distribution processing as an example of such processing, depending on an embodiment, which will be described later.

The game machine 3B includes a monitor MO, a speaker SP, a touch panel TP, a control unit 31, and a storage unit 32. The monitor MO and the speaker SP are output devices that are controlled based on an output signal from the control unit 31. Specifically, the monitor MO is a well-known display device for displaying various images including a game screen for allowing the music game to be played therein. The speaker SP is a well-known audio output device for reproducing various sounds including pieces of music in the music game. On the other hand, the touch panel TP is a well-known input device that receives a signal as an input according to a position thereon where a touch operation is made by a finger. Various input devices for receiving play actions as inputs may be provided to the game machine 3B as appropriate. As an example, such a touch panel is provided in such a manner as to cover a display face of the monitor MO. The touch panel TP outputs a signal according to a position of a touch operation to the control unit 31. Incidentally, besides the monitor MO, the speaker SP, and the touch panel TP, the game machine 3B may include various output devices and input devices as appropriate, such as a consideration collection device for collecting a predetermined consideration, or a reader used to read various ID cards and the like.

As an example, the storage unit 32 is configured by using a storage unit including a non-transitory storage medium (computer-readable storage medium), such as a hard disk array, although the storage unit 32 may be configured as appropriate in such a manner as to be able to store various data and the like. The storage unit 32 stores a program (computer program) PG3 and game data GD to be referred to by the control unit 31, as appropriate. The game data GD is data required to play the music game. The game data GD includes, for example, the above-mentioned music data MD and music score data QD. Incidentally, besides the above, the game data GD may include various data required to provide the game, for example, image data for displaying various images, audio data for reproducing various sounds, or play data for managing a game-related record of each user.

The control unit 31 is configured by using a computer hardware resource (for example, a CPU) of the game machine 3B. In the control unit 31, various logical devices are configured by combining the hardware resource included in the control unit 31 and the program PG3 stored in the storage unit 32. In the example in FIG. 3, an opportunity provision device 33, a guidance execution device 35, and a judgement device 36 are provided as such logical devices.

The opportunity provision device 33 is a logical device that executes processing for providing various selection opportunities required in the music game. For example, the music game includes a selection opportunity such as a music selection opportunity for selecting a piece of music for play from among a plurality of pieces of music, or a difficulty level selection opportunity for selecting a difficulty level of play, although various selection opportunities may be included as appropriate. Additionally, the music selection opportunity is provided in such a manner as to include many pieces of music distributed by the music distribution service as options for a piece of music for play. The opportunity provision device 33 executes various processing for providing such selection opportunities.

Processing related to member authentication may be implemented as appropriate. As an example, the processing is executed by the opportunity provision device 33 as processing incidental to a music selection opportunity, in some cases. Accordingly, as an example of such processing, the opportunity provision device 33 executes the above-mentioned authentication implementation processing in corporation with the authentication implementation device 13 of the game distribution system 10 and the authentication device 23 of the music distribution system 20, in some cases. Moreover, as an example of similar processing, the opportunity provision device 33 also executes the above-mentioned music score transmission processing in cooperation with the authentication implementation device 13 of the game distribution system 10, in some cases.

Further, in the music game service, the music data MD is acquired via the music distribution system 20. As an example, such acquisition is performed by the opportunity provision device 33 as processing incidental to member authentication, in some cases. Accordingly, as an example of such processing, the opportunity provision device 33 also executes the above-mentioned game music distribution service in cooperation with the music distribution device 24 of the music distribution system 20 or the authentication implementation device 13 of the game distribution system 10, in some cases.

The judgement device 36 is a logical device that executes various processing for judging, based on the music score data QD, timings of actual play actions of each player. Similarly, the guidance execution device 35 is a logical device that executes various processing for giving, based on the music score data QD, a guide on an execution timing of each play action. Such processing includes, for example, processing for reproducing a piece of music based on the music data MD, and processing for giving a guide on each execution timing in rhythm with the piece of music. In other words, processing for giving a guide on each execution timing based on a combination of the music data MD and the music score data QD is included.

Figure 4:
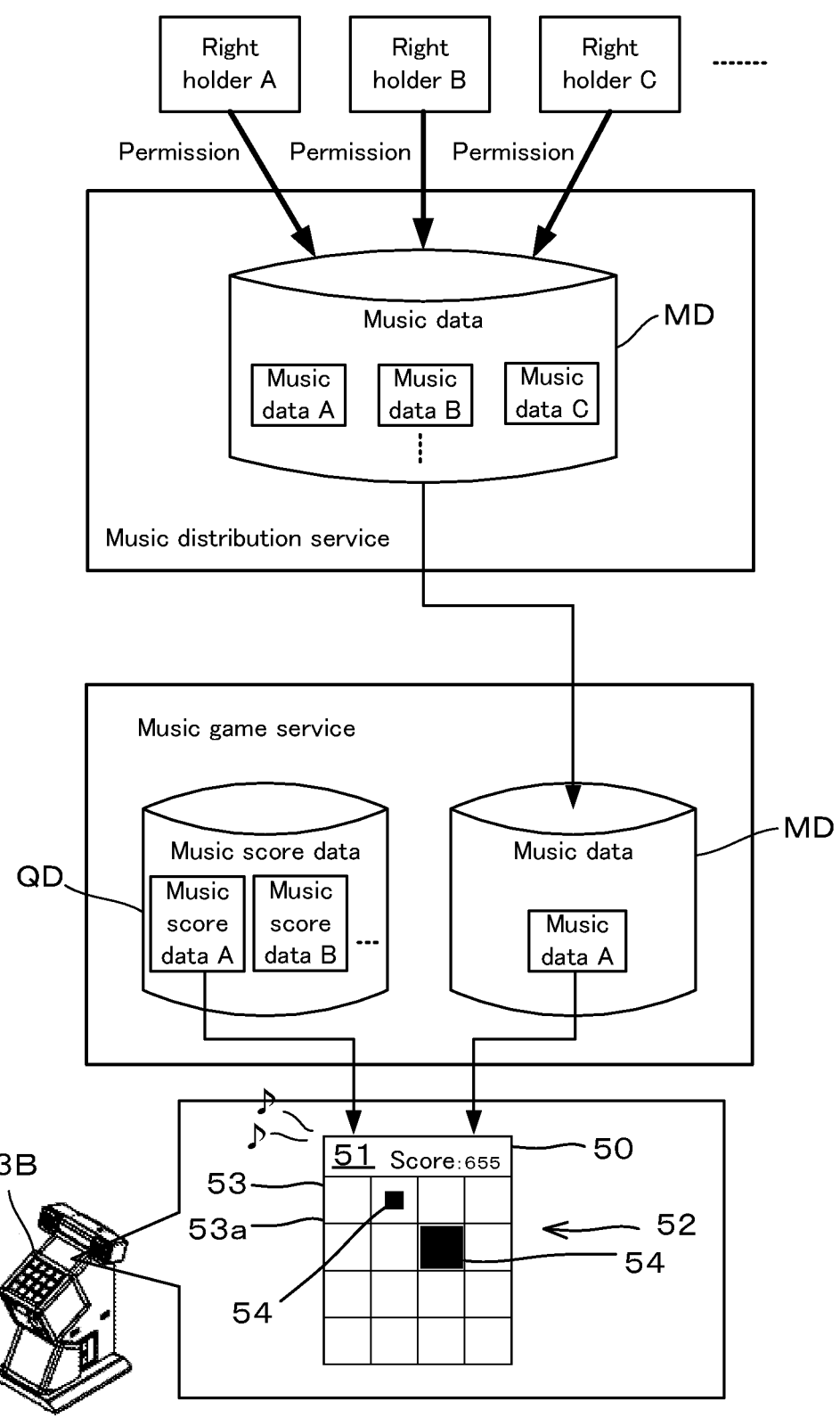
FIG. 4 is an explanatory diagram for describing an outline of the music game service.

Next, details of the music game service are described with reference to FIG. 4. FIG. 4 is an explanatory diagram for describing an outline of the music game service. As shown in FIG. 4, the music game service, which is one of services for allowing the game machine 3B to provide a music game, is configured as a service for allowing each piece of music in the music distribution service, which is provided by the music distribution system 20 separately from the music game, to be used in play of the music game. In other words, the music game service is a service for allowing pieces of music that are distributed exclusively to members in the music distribution service, to be used in play of the music game provided by the game machine 3B.

Specifically, the music game provided by the game machine 3B is a type of game that gives a user, in rhythm with a piece of music, guides on timings at which appropriate play actions should be executed as described above, and that judges timings of actual play actions. As an example, the game machine 3B visually gives guides on execution timings of appropriate play actions via a guide screen 50, although guides may be given via voice. The guide screen 50 is a game screen for visually giving a guide on each execution timing in rhythm with a piece of music. In the example in FIG. 4, the guide screen 50 includes an information field 51 and a play field 52, although the guide screen 50 may be configured as appropriate in such a manner as to be able to give a guide on each execution timing.

The information field 51 is a field for displaying various information related to play of the music game. Although the information field 51 may be formed in any of various forms at an appropriate position in the guide screen 50, the information field 51 in the example in FIG. 4 is formed in a strip shape in a horizontal direction on an upper side of the guide screen 50, with a constant width from a left end to a right end of the guide screen 50. Moreover, although the constant width of the information field 51 may be set as appropriate, the information field 51 in the example in FIG. 4 is formed to have a width to such an extent that a square field is formed in an area below the information field 51 in the guide screen 50. In the information field 51, a score is displayed in the example in FIG. 4, although various information related to game play may be displayed as appropriate. The score is information indicating points ("655") gained by a user during play.

On the other hand, the play field 52 is a field used to play the music game. Although the play field 52 may be formed in any of various forms (including shape, size, color, and appropriate combination thereof) at an appropriate position in the guide screen 50, the play field 52 in the example in FIG. 4 is formed in an entire area excluding the information field 51 in the guide screen 50. As a result, the play field 52 is formed in a square shape. In the music game, various actions may be executed as play actions, depending on an input device provided to the game machine 3B. As an example, touch operations on the play field 52, which are detected by the above-described touch panel TP, are executed as play actions. Accordingly, an operation portion 53 in which a touch operation should be executed is provided in the play field 52.

In the play field 52, 16 (a plurality of) operation portions 53 are provided in the example in FIG. 4, although an appropriate number of operation portions 53 may be provided. Each operation portion 53 may be provided in an appropriate form and, for example, may be formed in any of various shapes, such as a circle, an ellipse, or any of various polygons. The same applies in terms of size and color. In the example in FIG. 4, each operation portion 53 is provided in a square shape with no color. Similarly, although each operation portion 53 may be provided in an appropriate arrangement, the operation portions 53 in the example in FIG. 4 are arranged in such a manner as to form rows and columns in two mutually orthogonal directions. More specifically, the 16 operation portions 53 are arranged in a 4×4 matrix, with each row and each column formed of four operation portions 53.

In the example in FIG. 4, each operation portion 53 is configured to give a guide on a timing of a touch operation in the operation portion 53, although each operation portion 53 may also be utilized for a purpose other than a touch operation as appropriate. Such guides may be implemented as appropriate. For example, guides may be configured in such a manner that each execution timing (timing of a touch operation) and an operation portion 53 in which the touch operation should be executed are indicated via information signaling a timing, such as numbers that are counted down, a change in color following a predetermined rule (for example, a change in color in the order of red, yellow, blue), or a change in form of an image, and via an operation portion 53 in which the information is displayed. As described above, each operation portion 53 may give a guide on a timing of a touch operation in the operation portion 53 as appropriate. As an example, each operation portion 53 gives a guide through display of a direction sign 54.

Specifically, the direction sign 54 is displayed in each operation portion 53 at an appropriate timing. In the example in FIG. 4, the direction sign 54 is formed in a square shape similar to each operation portion 53 and displayed in such a color as to correspond to a black solid square, although any of various forms and an image may be used for the direction sign 54. The direction sign 54 may give a guide on a timing of a touch operation as appropriate through a change in shape or the like. As an example, the direction sign 54 gives a guide on a timing of a touch operation through coinciding with a position of a reference sign as follows. Specifically, first, each direction sign 54 appears in a small size around a center of each operation portion 53. Thereafter, each direction sign 54 gives a guide on a timing of a touch operation through changing in size in such a manner as to gradually expand to the same size as each operation portion 53.

For example, in the example in FIG. 4, a relatively small direction sign 54 is displayed in an operation portion 53 in the top row and the second left column. On the other hand, in an operation portion 53 in the second row from the top and the third column from the left, a direction sign 54 is displayed in a size that is larger than the above-mentioned direction sign 54 and is close to the size of the operation portion 53. A change between such sizes corresponds to a change over time. Such a change may be construed as staging each direction sign 54 in such a manner that the direction sign 54 moves closer to an operation portion 53 from a far side of a virtual three-dimensional space formed to give a depth to the operation portion 53. In any case, a guide on a timing of a touch operation is given through coincidence of size (including sizes within a predetermined range that can be regarded as coinciding) between a direction sign 54 and an operation portion 53, and consequently, a frame border 53a defining a perimeter (border) of each operation portion 53 functions as the reference sign. A user is requested to execute a touch operation in an operation portion 53 in which such a direction sign 54 is displayed, according to such coincidence. When an operation portion 53 in which a touch operation is executed is correct, the touch operation (play action) is judged in such manner that the smaller a time lag between an execution timing indicated by the direction sign 54 and an execution timing of the touch operation is, the more highly the touch operation is judged.

The guide screen 50 is implemented based on various data such as image dada for displaying the direction signs 54 and the like, and such data includes the music score data QD. In the music score data QD, various information may be described as information on each execution timing and the like. For example, each timing at which the size of a direction sign 54 should coincide with the size of a frame border 53a is described as each execution timing, and an operation portion 53 in which a touch operation should be executed (in other words, an operation portion 53 in which each direction sign 54 should be displayed) is described as an appropriate play action. When an appropriate touch operation is actually executed by a player, an execution timing of the actual touch operation is judged based on the execution timing in the music score data QD. When a plurality of pieces of music or a plurality of difficulty levels is prepared in the music game, the music score data QD is prepared for each piece of music or each difficulty level.

A piece of music is reproduced while the guide screen 50 is displayed such that the size of each direction sign 54 changes in rhythm with the piece of music, and the piece of music is reproduced based on the music data MD. In other words, the game machine 3B implements the music game based on a combination of the music data MD and the music score data QD. Accordingly, to provide the music game, the music data MD and the music score data QD are required.

On the other hand, the music distribution service is a service for distributing pieces of music to members as described above. Accordingly, the music data MD for reproducing each piece of music for distribution is prepared in the music distribution service. Since a right holder exists for each piece of music for distribution, a restriction on each piece of music as a distribution object is lifted (distribution is started) after permission is obtained from the right holder of each piece of music. In the example in FIG. 4, a right holder such as "right holder A", "right holder B", or "right holder C" is shown, and corresponds to the right holder of a piece of music A, a piece of music B, or a piece of music C, respectively. In such a case, distribution of the pieces of music A to C is commenced after permission of the respective right holders is obtained. Accordingly, when permission of the right holders is obtained, "music data A", "music data B", and "music data C" corresponding to the pieces of music A to C, respectively, are added to the music data MD as distribution objects.

The music game service is configured to use each piece of music in the above-described music distribution service in play of the music game. Specifically, a music selection opportunity provided by the game machine 3B is configured to include each piece of music in the music distribution service, such as the pieces of music A to C, as an option through the music game service. On the other hand, since the music distribution service is a different service from the music game, the music score data QD required to play the music game is not prepared. Accordingly, in the music game service, music score data QD corresponding to each piece of music (music data MD) prepared for distribution in the music distribution service is separately prepared via an operator of the music game service, a user of the music game service, or the like. In other words, in the music game service, the music score data QD for the music game service is prepared, and the music score data QD includes music score data QD corresponding to each piece of music in the music distribution service, such as "music score data A" corresponding to the piece of music A and "music score data B" corresponding to the piece of music B. Such music score data QD is provided through the music game service as the music score data QD required to provide the music game.

For example, when the piece of music A, among pieces of music for distribution in the music distribution service, is selected as a piece of music for play at a music selection opportunity, the "music data A" for the piece of music A managed by the music distribution service is provided to the game machine 3B through the music game service. Similarly, of the music score data QD separately prepared for the music game service, the "music score data A" corresponding to the piece of music A is provided to the game machine 3B through the music game service. Based on a combination of the "music score data A" and the "music data A", giving of a guide on each execution timing in rhythm with the piece of music A and the like are implemented. Specifically, the piece of music A is reproduced based on the "music data A", the guide screen 50 is displayed in which each direction sign 54 changes in size in rhythm with the piece of music A, and a timing of an actual touch operation in each operation portion 53 is judged based on each execution timing in the "music score data A". In the present example, the pieces of music A to C function as a plurality of pieces of music and options in the present invention. Moreover, the piece of music A, the "music score data A", and the "music data A" function as a piece of music for play, music score data for play, and music data for play in the present invention, respectively. Further, the "music data A" to "music data C", and the "music score data A" to "music score data B" function as a plurality of pieces of music data and a plurality of pieces of music score data in the present invention, respectively.

In the music game service, music data MD corresponding to each piece of music for distribution in the music distribution service may be provided as appropriate. For example, the music data MD may be provided directly from the music distribution system 20 to the game machine 3B, or may be provided indirectly from the music distribution system 20 to the game machine 3B via the game distribution system 10. However, procedures (roles) may be different between in the game distribution system 10 and in the music distribution system 20 in some cases, depending on a method of providing the music data MD. Hereinafter, a provision procedure for providing the music data MD for the music distribution service to the game machine 3 in the music game service will be described in each embodiment.

First Embodiment

Figure 5:
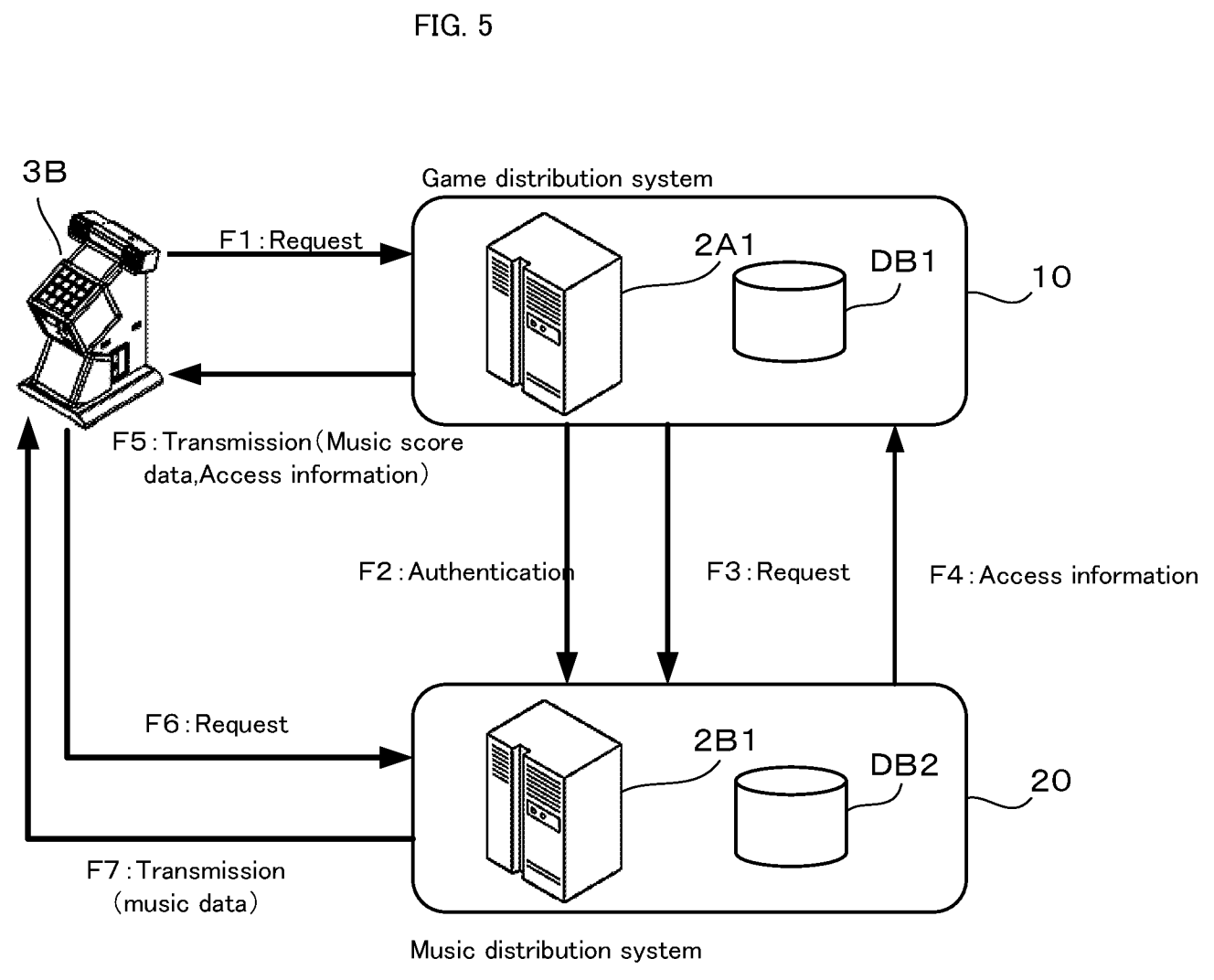

A provision procedure according to a first embodiment is described with reference to FIGS. 5 to 11. FIG. 5 is an explanatory diagram for describing a flow of the music game service in the provision procedure according to the first embodiment. The provision procedure according to the first embodiment is a type of procedure in which the game distribution system 10 is involved in member authentication required to use the music distribution service, and the game distribution system 10 performs member authentication of a player on behalf thereof. The provision procedure according to the first embodiment includes a case where membership information on each player is used in member authentication, and a case where the game distribution system 10 functions as a member of the music distribution service and membership information on the game distribution system 10 is used in member authentication. As shown in FIG. 5, such a provision procedure according to the first embodiment includes sub-procedures F1 to F7, as sub-procedures for implementing the music game service. Incidentally, instead of the game distribution system 10, an appropriate unit, such as a predetermined facility or each game machine 3B, may acquire membership information (for example, since the music distribution service charges a fee in many cases, membership information may be acquired by a unit used to calculate a fee for use of the music distribution service), in which case membership information on such a facility or the like, instead of the game distribution system 10, may be used in member authentication.

Specifically, in the music game service, first, the game machine 3B sends a request to the game distribution system 10 to provide the music game service (F1). Such a request may be implemented as appropriate. As an example, information on each piece of music that is distributed in the music distribution service is provided beforehand from the game distribution system 10, and the request is sent when a piece of music in the music distribution service is selected as a piece of music for play, although the request may include, for example, a request for information on each piece of music that is distributed in the music distribution service. When the membership information on each player is used in member authentication, implementation of the request includes input of such information for member authentication. In such a case, the request includes membership information for member authentication, such as a member ID or a password.

Moreover, for example, the game machine 3B may provide the music game while identifying each player via a user ID (an ID given by the game distribution system 10 and another ID managed in a different system from the system managing member IDs) for identifying each player playing the music game. In such a case, although input of membership information may be requested each time, the game distribution system 10, as an example, associates membership information with a user ID to manage when the membership information is provided for the first time, and thereafter, input of the user ID is requested instead of provision of the membership information. In other words, while a user ID and membership information are included in a request to the game distribution system 10 when the music game service is used for the first time, input and transmission of the membership information are omitted at second and subsequent uses.

When the game distribution system 10 acquires the request from the game machine 3B, the game distribution system 10 accesses the music distribution system 20 and performs member authentication to use the music distribution service (F2). Specifically, when the membership information on each player is used in member authentication, the game distribution system 10 implements member authentication, based on the membership information included in the request. When the membership information on the game distribution system 10 is used in member authentication, the game distribution system 10 implements member authentication by using the membership information such as the own member ID and password.

When the member authentication has succeeded, the game distribution system 10 sends a request to distribute the target piece of music (the piece of music for play requested by the game machine 3B) (F3). Incidentally, when the membership information on each player is used in member authentication, there is a possibility that the member authentication fails (member authentication is processed to result in an error). In such a case, the game distribution system 10 notifies an error (authentication failure) to the game machine 3B and requests correct information for member authentication until member authentication succeeds, or use of the piece of music in the music distribution service is cancelled.

When the music distribution system 20 acquires the request to distribute the piece of music from the game distribution system 10, the music distribution system 20 generates access information for distributing the target piece of music and transmits the access information to the game distribution system 10 (F4). For the access information, appropriate information may be used as long as distribution of the piece of music can be implemented. For example, information on a dedicated URL (an address of a location built exclusively for the music distribution system 20) used to distribute the target piece of music is used.

When the game distribution system 10 acquires the access information from the music distribution system 20, the game distribution system 10 identifies music score data QD corresponding to the target piece of music and transmits the identified music score data QD and the access information to the game machine 3B (F5).

When the game machine 3B acquires the music score data QD and the access information, the game machine 3B accesses the music distribution system 20, based on the access information. For example, when information on a URL is used for the access information, the game machine 3B accesses the URL configured in the music distribution system 20. As an example, access to the access information is automatically executed by the game machine 3B as described above, although access to the access information may be executed based on an operation by a player. Then, the game machine 3B requests distribution of the target piece of music at the URL (F6).

When distribution of the target piece of music is requested through access to the URL by the game machine 3B, the music distribution system 20 transmits music data MD for reproducing the piece of music to the game machine 3B (F7). When the game machine 3B acquires the music data MD, the game machine 3B provides the music game to the player by combining the music data MD with the music score data QD provided by the game distribution system 10. In other words, the game machine 3B displays the guide screen 50 in rhythm with the piece of music (music data MD) acquired from the music distribution system 20 such that a guide on each execution timing is given and play actions are judged, based on the music score data QD acquired from the game distribution system 10. As an example, in the provision procedure according to the first embodiment, the music game service is provided through the flow as described above.

Figure 6:
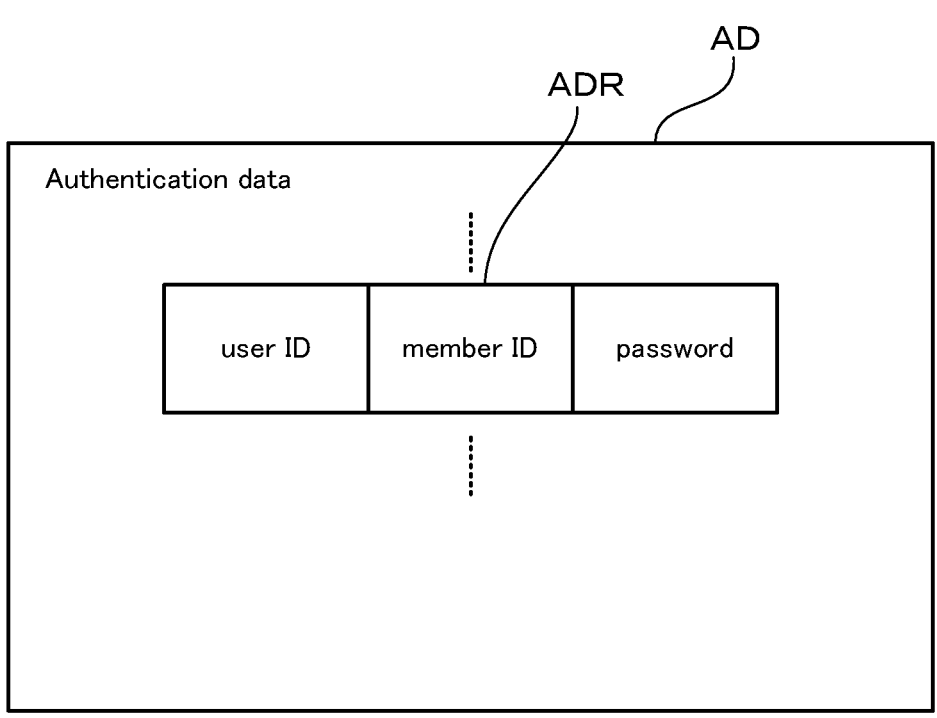
FIG. 6 shows an example of a configuration of authentication data.

Next, details of the authentication data AD is described. FIG. 6 shows an example of a configuration of the authentication data AD. As described above, the authentication data AD can be stored in the game distribution system 10 and the music distribution system but information described in the authentication data AD may be different between the two in some cases. The example in FIG. 6 shows the authentication data AD stored in the game distribution system 10. More specifically, the example in FIG. 6 shows a case where a user ID and information for member authentication are managed in association with each other in the authentication data AD in the game distribution system 10. In such a case, as shown in FIG. 6, the authentication data AD includes an authentication record ADR for managing the information for member authentication for each user. To implement such management, each authentication record ADR includes "user ID", "member ID", and "password" information.

The "user ID" is information indicating a user ID of each user. The "member ID" is information indicating a member ID of each member. The "password" is information indicating a password functioning as a code for authenticating each member. In each authentication record ADR, such pieces of information are recorded in association with each other. Incidentally, the authentication data AD is not limited to such information, but may include various information as appropriate, depending on convenience of authentication or the like. Alternatively, part of the above-described information or the like may be omitted as appropriate. For example, in the authentication data AD managed by the music distribution system 20, the "user ID" information may be omitted.

Next, authentication implementation processing, game music distribution processing, and data generation processing in the provision procedure according to the first embodiment are described. The authentication implementation processing is processing for implementing authentication to use the music distribution service in the music game service. The provision procedure according to the first embodiment includes a case where each player is a member, and a case where the game distribution system 10 is a member. The example in FIG. 7 shows the authentication implementation processing when member authentication is performed based on the membership information on each player. At a music selection opportunity, although a piece of music other than those in the music distribution service may be presented as an option, the example in FIG. 7 shows the authentication implementation processing when only each piece of music in the music distribution service is presented as an option. Incidentally, the examples in FIGS. 7 to 10 show processing executed mainly by the opportunity provision device 33 of the game machine 3B, processing executed mainly by the authentication implementation device 13 of the game distribution system 10, and processing executed mainly by the authentication device 23 of the music distribution system 20, as processing by the game machine 3B, the game distribution system, and the music distribution system 20, respectively.

For example, when a predetermined operation for requesting play of the music game is performed, the game machine 3B requests that the player input membership information for member authentication, and when the membership information is inputted, the game machine 3B starts the authentication implementation processing in FIG. 7 and first provides a music selection opportunity in such a manner that each piece of music in the music distribution service is included among options (step S101).

Subsequently, the game machine 3B sends a request to use a piece of music selected at the music selection opportunity to the game distribution system 10 (step S102). The request is made in such a manner as to include information on the requested piece of music and the membership information inputted by the player. Incidentally, when a user ID is managed in association with the membership information and use of the music game service by the current player is a second or subsequent use, the game machine 3B may request input of the user ID instead of the membership information. In such a case, the request includes information on the user ID in place of the membership information.

When the request to use, for play, the piece of music that is distributed in the music distribution service is sent from the game machine 3B, the game distribution system 10 starts the authentication implementation processing in FIG. 7 and first acquires the request (a result of selection at the music selection opportunity, and the like) (step S201). Subsequently, the game distribution system 10 sends a request for member authentication to use the music distribution service to the music distribution system 20 (step S202). Incidentally, when the information on the user ID is included in the request in place of the membership information, the game distribution system 10 first refers to the authentication data AD and identifies the member information corresponding to the user ID. Then, the request for authentication is made based on the identified membership information. In the present example, the user ID functions as user identification information in the present invention. Moreover, the authentication data AD in which the user ID and the membership information are described in association with each other functions as authentication information data in the present invention.

When the request for member authentication to use the music distribution service is sent from the game distribution system 10, the music distribution system 20 starts the authentication implementation processing in FIG. 7 and first acquires the request (step S301). Subsequently, the music distribution system 20 performs member authentication for the music distribution service, based on the membership information included in the acquired request, and determines whether the authentication has succeeded or failed (step S302). When the member authentication results in an error (has failed), the music distribution system 20 transmits the "error" result to the game distribution system 10 (step S303)

and terminates the current authentication implementation processing. In the present example, the membership information including a member ID and a password functions as authentication information in the present invention.

In contrast, when the member authentication has succeeded, the music distribution system 20 identifies the target piece of music to distribute, based on the request acquired at step S301 (step S304). Subsequently, the music distribution system 20 generates address information for distributing the identified piece of music (requested piece of music), in other words, music data MD corresponding to the piece of music (step S305). As an example, distribution of the music data MD is implemented through streaming distribution, although distribution of the music data MD may be implemented as appropriate. Moreover, as an example of the address information, a dedicated URL address for streaming the music data MD corresponding to the target piece of music is used. In other words, at step S305, the music distribution system 20 generates the URL address as the address information by configuring the URL address dedicated to streaming the music data MD. The music distribution system 20 transmits, to the game distribution system 10, the address information generated at step S305, that is, the information on the URL address dedicated to streaming the target music data MD (step S306) and terminates the current authentication implementation processing.

When the result of the member authentication is transmitted from the music distribution system 20, the game distribution system 10 acquires the authentication result (step S203). The game distribution system 10 determines whether or not the authentication result is a success (step S204). When the authentication result is an error (failure) (step S204: No), the game distribution system 10 transmits the "error" result to the game machine 3B and terminates the current authentication implementation processing, with the subsequent processing skipped.

In contrast, when the result of the member authentication is a success (step S204: Yes), the game distribution system 10 identifies music score data QD that is a target of the request (step S205). Subsequently, the game distribution system 10 transmits the result of the member authentication to the game machine 3B (step S206). The result of the member authentication includes the music score data QD identified at step S205 and the address information transmitted from the music distribution system 20. After the transmission, the game distribution system 10 terminates the current authentication implementation processing.

When the result of the member authentication is transmitted from the game distribution system 10, the game machine 3B acquires the result (step S103) and determines whether or not the authentication result is a success (step S104). When the result of the member authentication is an error, the game machine 3B, while showing the result, requests that the player input the membership information again (step S105). When the membership information is inputted again by the player, the game machine 3B returns to step S101 and executes the subsequent processing again. Incidentally, when the membership information on the player is not inputted (including a timeout with passage of a predetermined time period), the game machine 3B may terminate the current authentication implementation processing.

In contrast, when the result of the member authentication is a success, the game machine 3B displays a wait screen on the monitor MO (step S106). The wait screen is a game screen for waiting for play of the music game to be started (a guide on each execution timing to be started). The wait screen may be implemented as appropriate and, for example, may be a screen in which countdowns to the start are simply performed, or a screen that requests a touch operation for the start. As an example, the wait screen is implemented as a screen that simply notifies "waiting". However, the wait screen may include various images (including a video) and the like as appropriate. After the display, the game machine 3B terminates the current authentication implementation processing.

In contrast, the example in FIG. 8 shows the authentication implementation processing when member authentication is performed based on the membership information on the game distribution system 10. In the example in FIG. 8, processing in common with the example in FIG. 7 is denoted by the same step numbers as in FIG. 7, and a description thereof is omitted. As shown in FIG. 8, processing at step S104 and processing at step S105 are omitted in the authentication implementation processing in the example in FIG. 8, compared to the example in FIG. 7. In the authentication implementation processing in the example in FIG. 8, since the membership information on the game distribution system 10 is used in member authentication, a request acquired at step S101 does not include membership information. Accordingly, at step S202, the game distribution system 10 requests member authentication based on the own membership information (which may be managed as appropriate; as an example, which is managed in the authentication data AD including information on the own member ID and password, with "user ID" information omitted), instead of the membership information included at step S102. In the present example, the own member ID functions as a special member ID in the present invention.

Similarly, when an error is acquired as a result of the member authentication (step S203), the game distribution system 10, instead of transmitting the result to the game machine 3B, returns to the processing at step S202 (step S204: No) and executes the subsequent processing again. Incidentally, when the game distribution system 10 uses the own membership information in member authentication, although the probability is thought to be low that the authentication result is an error, various troubles are conceivable. Accordingly, for example, when any of various troubles is determined, such as in a case of a predetermined number of consecutive errors, the game distribution system 10 may transmit the "error" result to the game machine 3B and may provide an appropriate guide, such as discontinuation of using the music game service.

Through the procedure in FIG. 7 or FIG. 8, member authentication to use the music distribution service is implemented via the game distribution system 10, and after such authentication, music data MD and music score data QD corresponding to a piece of music in the music distribution service are provided to the game machine 3B. In other words, the provision procedure according to the first embodiment is implemented. More specifically, the subprocedures F1 to F5 in the provision procedure according to the first embodiment are implemented. Incidentally, in the example in FIG. 7 or FIG. 8, the server unit 2A for game distribution (or the game distribution database DB1) in the game distribution system 10 functions as a server device and a music score data server in the present invention.

Figure 9:
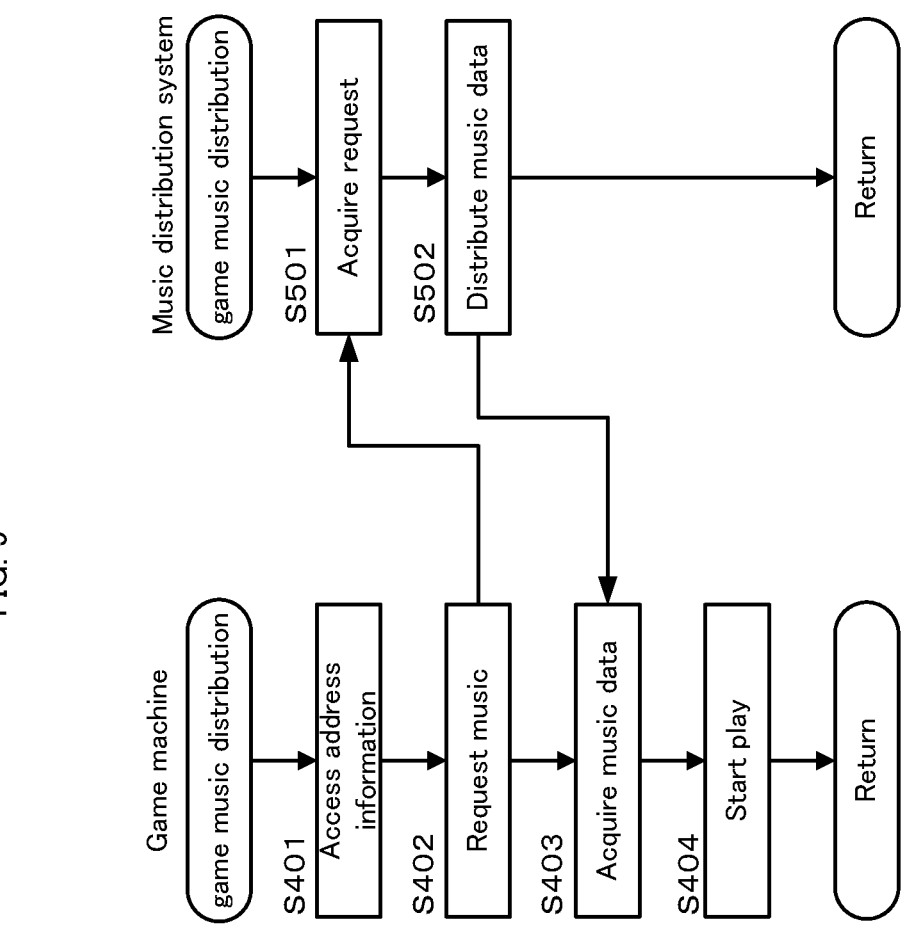
FIG. 9 is a flowchart showing an example of a procedure for game music processing according to the first embodiment.

The game music distribution processing is processing for distributing the music data MD to the game machine 3B from the music distribution system 20, as part of the music game service. The example in FIG. 9 shows the game music distribution processing when distribution of the music data MD is implemented through access to address information provided to the game machine 3B via the game distribution system 10. The example in FIG. 9 shows the game music distribution processing when the authentication implementation processing according to the example in FIG. 7 or the example in FIG. 8 is executed. In such a case, as an example, access to the address information also functions as an instruction to start play of the music game, although access to the address information may be used only to acquire the music data MD. In such a case, the game machine 3B starts the game music distribution processing in FIG. 9 each time the wait screen is displayed through the procedure in FIG. 7 or the like, and first accesses address information, that is, a URL acquired from the game distribution system 10 (step S401). Subsequently, the game machine 3B sends a request to distribute a piece of music at the accessed URL (step S402).

When the request to distribute the piece of music is sent from the game machine 3B, the music distribution system 20 starts the game music distribution processing and first acquires the request (step S501). Subsequently, the music distribution system 20 identifies the piece of music to distribute, based on the request, and distributes music data MD corresponding to the piece of music (step S502). After the distribution, the music distribution system 20 terminates the current game music distribution processing.

When the music data MD is distributed from the music distribution system 20, the game machine 3B acquires the music data MD (step S403). Subsequently, the game machine 3B starts play, based on the acquired music data MD (step S404). In other words, the game machine 3B stops displaying the wait screen and starts displaying the guide screen 50. The start of displaying the guide screen (the stop of displaying the wait screen) may be performed as appropriate. For example, although display of the guide screen may be started after the whole music data MD corresponding to the piece of music is acquired, display of the guide screen is started, as an example, when packets of the music data MD corresponding to a predetermined reproduction period are acquired so that the piece of music is reproduced on demand through streaming distribution. More specifically, the game machine 3B starts reproducing the piece of music based on the acquired music data MD and, at the same time, starts displaying the guide screen 50 based on music score data QD (for example, acquired through the procedure in FIG. 7 or FIG. 8) corresponding to the piece of music in such a manner that a guide on each execution timing is given in rhythm with the piece of music. In other words, the game machine 3B starts giving a guide on a timing of each touch operation (play action), based on a combination of the music data MD acquired from the music distribution system 20 and the music score data QD acquired from the game distribution system 10. After the start of giving guides, the game machine 3B terminates the current game music distribution processing. Thus, the music data MD corresponding to the piece of music in the music distribution service is acquired to play the music game. More specifically, the sub-procedures F6 to F7 in the provision procedure according to the first embodiment are implemented. Then, play of the music game using the music game service is implemented. In the present example, the server unit 2B for music distribution (or the database DB2 for music distribution) in the music distribution system 20 functions as a music distribution server and a music data server in the present invention.

FIG. 10 is a flowchart showing an example of a procedure for game music distribution processing according to a modification. A function of the music distribution service may be utilized in the music game as appropriate, and in order to utilize such a function, it is better to provide a music selection opportunity after member authentication, in some cases. The example in FIG. 10 shows the game music distribution processing when a music selection opportunity is provided after member authentication. In the following, processing in common with the example in FIG. 9 is denoted by the same step numbers as in FIG. 9, and a description thereof is omitted.

As shown in FIG. 10, in the game music distribution processing according to the modification, compared to the example in FIG. 9, the game machine 3B, after accessing address information (step S401), sends a request for a list of distributable pieces of music in the music distribution service to the music distribution system 20 (step S411).

When the request for the list is sent from the game machine 3B, the music distribution system 20 starts the game music distribution processing in FIG. 10 and first acquires the request (step S511). Subsequently, the music distribution system 20, to respond to the request, transmits the list of the distributable pieces of music in the music distribution service to the game machine 3B (step S512). The list may include a pickup list in which some pieces of music are picked up as appropriate, such as a play list or a preference list.

When the game machine 3B acquires the list from the music distribution system 20, the game machine 3B provides a music selection opportunity, based on the list (step S412). The music selection opportunity includes each piece of music in the acquired list as a candidate for a piece of music for play. In such a case, the music selection opportunity may present a piece of music other than those in the list, that is, a piece of music other than the distributable pieces of music in the music distribution service, as a candidate for a piece of music for play. The distributable pieces of music in the music distribution service obviously include the pieces of music in the pickup list such as a play list, and the pieces of music in the pickup list may be presented distinguishably from the others at the music selection opportunity. For example, the game machine 3B may make the pieces of music in the pickup list distinguishable from the other pieces of music, by limiting options to the pieces of music in the pickup list such as a play list at the music selection opportunity, or by making the pieces of music in the pickup list more easily recognizable as appropriate, such as by adding various information or by sorting the pieces of music.

Subsequently, the game machine 3B sends a request for a piece of music, based on a result of selection at the music selection opportunity, and the request is sent not only to the music distribution system 20 but also to the game distribution system 10 (step S402).

When the request is sent from the game machine 3B, the game distribution system 10 starts the game music distribution processing in FIG. 10 and first acquires the request (step S601). Subsequently, the game distribution system 10 identifies music score data QD corresponding to the target piece of music sought by the acquired request (step S602) and provides the identified music score data QD to the game machine 3B (step S603). After the provision, the game distribution system 10 terminates the current game music distribution processing.

When the music score data QD is provided from the game distribution system 10, the game machine 3B acquires the music score data QD and also music data MD distributed from the music distribution system 20 (step S403). Then, the game machine 3B starts play based on the acquired music data MD and music score data QD (step S404) and terminates the current game music distribution processing. Thus, a music selection opportunity is provided after member authentication, and not only latest pieces of music are presented as options, but a function of the music distribution service, such as a play list, is also reflected in the music selection opportunity. Incidentally, when the game music distribution processing in the example in FIG. 10 is executed, the authentication implementation processing in the example in FIG. 7 or the example in FIG. 8 may be started, not at a request for a piece of music, but at a request for member authentication to use the music game service, and for example, the processing at step S101 may be omitted. Moreover, in the example in FIG. 7, the processing at steps S204 to S206 may be omitted, and the address information and the like to be transmitted at step S206 may be transmitted at step S203. Similarly, in the example in FIG. 8, step S205 may be omitted.

Figure 11:
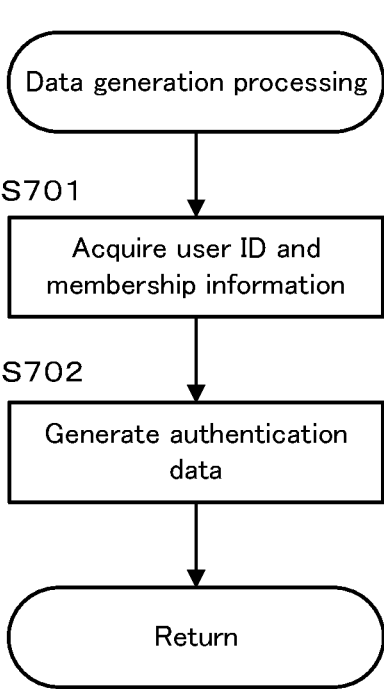
FIG. 11 is a flowchart showing an example of a procedure for data generation processing.

The data generation processing is processing for generating data for managing a user ID and membership information in association with each other. As an example, the association between the user ID and the membership information is managed in the authentication data AD in the game distribution system 10 as described above, although the association may be managed by using appropriate data. An example in FIG. 11 shows the data generation processing when authentication data AD for managing association between a user ID and membership information is generated. In such a case, when a request to use the music game service is made, via the game machine 3B, by a player who uses the music game service for the first time (for example, step S102 in FIG. 7), the authentication implementation device 13 acquires a user ID and membership information included in the request (step S701).

Subsequently, the authentication implementation device 13 generates authentication data AD including the user ID and the membership information acquired at step S701 (step S702). More specifically, authentication data AD including an authentication record ADR that associates the user ID and the membership information acquired at step S701 is generated. In other words, the authentication data AD is updated such that an authentication record ADR that associates the user ID and the membership information acquired at step S701 is added. After the authentication data AD is generated (updated), the authentication implementation device 13 terminates the current data generation processing. Thus, a user ID and membership information are associated to be managed at a first use of the music game service, and second and subsequent uses are simplified. More specifically, at a second or subsequent use, the membership information is identified based on the user ID, and consequently, input of the membership information is omitted.

Incidentally, the authentication data AD may include certification information for certifying authentication success in place of membership information, and may be configured in such a manner that membership information and a user ID are associated via the certification information (indirect information). For example, when member authentication has succeeded at a first use, the music distribution system 20 may issue certification information that certifies the authentication success, such as a so-called token, and the authentication data AD may manage, in place of membership information, the certification information issued by the music distribution system 20 (preferably, the information is verifiable by the music distribution system 20) in association with a user ID. In such a case, at a second or subsequent use, the certification information may be transmitted to the music distribution system 20 instead of the membership information, and the music distribution system 20 may perform verification of the certification information instead of member authentication. Use of the certification information can enhance security of information management, compared to a case where a user ID and membership information are directly associated.

As described hereinabove, according to the provision procedure of the first embodiment, the music distribution service that is provided exclusively to members (or mobile terminal devices 4A used by such members) after member authentication is utilized for a piece of music for play in the music game through the music game service. Specifically, in play of the music game, a music selection opportunity including, as options, many pieces of music prepared in the music distribution service is provided to the game machine 3B as an opportunity to select a piece of music for play. When a piece of music in the music distribution service is selected as the piece of music for play at the music selection opportunity, music score data QD and music data MD corresponding to the piece of music for play are acquired from the game distribution system 10 or the music distribution system 20. More specifically, the game machine 3B acquires the music score data QD from the game distribution system 10 and acquires the music data MD from the music distribution system 20. The music score data QD and the music data MD acquired from the respective systems are used for reproduction of the piece of music, display of the guide screen 50, or the like in such a manner that giving of a guide on each execution timing in rhythm with the piece of music for play and the like are performed on the game machine 3B, based on a combination of the music score data QD and the music data MD. Thus, each piece of music prepared in the music distribution service that is provided exclusively to members can be utilized in play of the music game.

The game distribution system 10 and the music distribution system 20 can assist the game machine 3B in implementing the music game service by playing a role of storing and distributing, via the network NT, the music score data QD or the music data MD. When an operator of the game distribution system 10 is different from an operator of the music distribution system 20, the music distribution service provided by the music distribution system 20, which is constructed as a separate system by the different operator, can be utilized in the music game on the game machine 3B via the game distribution system 10. In such a case, an operator of the game machine 3B or the operator of the game distribution system 10 (in many cases, the operators are identical) can entrust individual negotiation on each piece of music for permission thereof, which is principally required when a piece of music is used, to the operator of the music distribution system 20 and can conduct comprehensive negotiation on use of each piece of music with the operator of the music distribution system 20. Thus, when many pieces of music are used in play of the music game, time and efforts can be reduced, compared to a case where individual negotiation is conducted. Consequently, a new piece of music can be introduced earlier.

When the own membership information, such as the own member ID, on the game distribution system 10 is used in member authentication, each piece of music in the music distribution service, which has an abundance of pieces of music, can be utilized in play of the music game, irrespective of whether or not a player of the game machine 3B is a member of the music distribution service. Moreover, for example, when a function of the music distribution service, such as a play list in which preferences of a member are reflected, is used in the music game, player convenience can be enhanced. Specifically, for example, when the pickup list, such as a play list or a preference list, is reflected in a music selection opportunity, each piece of music picked up beforehand through the music distribution service can be used for a candidate for a piece of music for play. Thus, since time required to select a piece of music at the music selection opportunity can be reduced, it is possible to allow a user to select a preferred piece of music as the piece of music for play more quickly and more easily at the music selection opportunity. Consequently, interest of the game can be thus achieved.

In the above-described embodiment, the opportunity provision device 33 of the game machine 3B functions as an opportunity provision device in the present invention by executing step S101 of the procedure in FIG. 7 or FIG. 8, or step S412 of the procedure in FIG. 10. Similarly, the opportunity provision device 33 of the game machine 3B functions as a music score acquisition device in the present invention by executing step S103 of the procedure in FIG. 7 or FIG. 8, or step S403 of the procedure in FIG. 10. Moreover, the opportunity provision device 33 of the game machine 3B functions as a music acquisition device in the present invention by executing step S403 of the procedure in FIG. 9, or step S403 of the procedure in FIG. 10. Further, the opportunity provision device 33 of the game machine 3B functions as a list acquisition device in the present invention by executing step S412 of the procedure in FIG. 10.

On the other hand, the authentication implementation device 13 of the game distribution system 10 functions as an ID acquisition device and an information provision device in the present invention by executing the procedure in FIG. 7 or FIG. 8. Specifically, the authentication implementation device 13 functions as the ID acquisition device and the information provision device by executing step S201 and step S202 of the procedure in FIG. 7 or FIG. 8, respectively. Moreover, the authentication implementation device 13 of the game distribution system 10 functions as an authentication provision device in the present invention by executing step S206 when authentication has succeeded in the procedure in FIG. 7 or FIG. 8. Further, the authentication implementation device 13 of the game distribution system 10 functions as a data generation device in the present invention by executing step S702 in FIG. 11.

Second Embodiment

Figure 12:
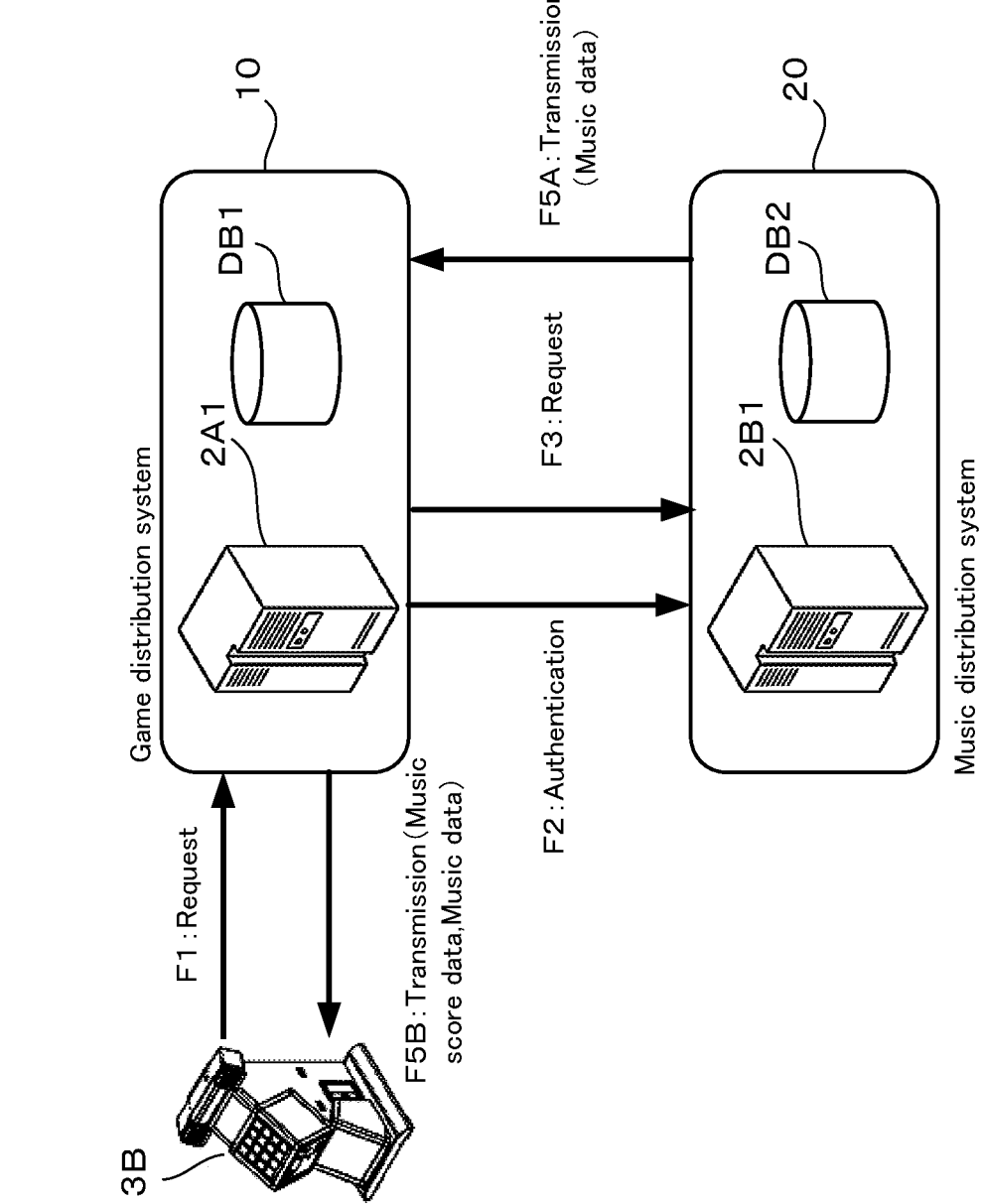
FIG. 12 is an explanatory diagram for describing a flow of the music game service in a provision procedure according to a second embodiment.

A provision procedure according to a second embodiment is described with reference to FIGS. 12 to 14. FIG. 12 is an explanatory diagram for describing a flow of the music game service in the provision procedure according to the second embodiment. The provision procedure according to the second embodiment is a type of procedure in which the game distribution system 10 is involved in member authentication required to use the music distribution service, and the game distribution system performs member authentication of a player on behalf thereof, similarly to the provision procedure according to the first embodiment. However, in the second embodiment, unlike the first embodiment, music data MD corresponding to a piece of music in the music distribution service is provided to the game machine 3B via the game distribution system 10. More specifically, in the second embodiment, the game distribution system 10 is interposed between the music distribution system 20 and the game machine 3B, and the game distribution system 10 acquires the music data MD from the music distribution system 20 and provides the music data MD to the game machine 3B. In the following, components in common with the first embodiment are denoted in the drawings by the same reference signs as in the first embodiment, and a description thereof is omitted.

As shown in FIG. 12, in the provision procedure according to the second embodiment, compared to the provision procedure according to the first embodiment, the sub-procedure F5 includes sub-procedures F5A and F5B. On the other hand, in the provision procedure according to the second embodiment, compared to the provision procedure according to the first embodiment, the sub-procedures F4, F6, and F7 are omitted. Specifically, in the provision procedure according to the second embodiment, as in the provision procedure according to the first embodiment, when the game distribution system 10 acquires a request from the game machine 3B (F1), the game distribution system 10, after authentication with the music distribution system 20 (F2), sends a request for a piece of music (F3). However, the music distribution system 20 transmits music data MD corresponding to the requested piece of music to the game distribution system 10 (F5A), instead of transmitting address information (F4). In other words, the game distribution system 10 acquires the music data MD directly from the music distribution system 20, instead of address information. Then, the game distribution system 10 transmits the music data MD together with music score data QD to the game machine 3B (F5B). In other words, in F5B, unlike the sub-procedure F5 in the provision procedure according to the first embodiment, the game distribution system 10 provides the music data MD directly to the game machine 3B, instead of address information (indirect information for acquiring the music data MD). Incidentally, in the sub-procedure F5B, the music score data QD and the music data MD may be transmitted at the same time, or with a time lag provided. When a time lag is provided between transmissions, transmission of the music score data QD and transmission of the music data MD may be implemented through different processing.

Next, authentication implementation processing and game music distribution processing according to the second embodiment are described. The authentication implementation processing and the game music distribution processing are processing as described above, but are partially different when the provision procedure according to the second embodiment is executed, from when the provision procedure according to the first embodiment is executed. In the following, common processing is denoted by the same step numbers, and a description thereof is omitted. Similarly, a description is omitted with respect to procedures for the data generation processing and the like that can be implemented as in the case where the provision procedure according to the first embodiment is executed. In the following, as in the examples in FIG. 7 and the like, processing executed mainly by the opportunity provision device 33 of the game machine 3B, processing executed mainly by the authentication implementation device 13 of the game distribution system 10, and processing executed mainly by the authentication device 23 of the music distribution system 20 are shown as processing by the game machine 3B, the game distribution system, and the music distribution system 20, respectively.

FIG. 13 is a flowchart showing an example of a procedure for the authentication implementation processing according to the second embodiment. The example in FIG. 13 shows the authentication implementation processing according to the second embodiment when member authentication is performed based on the membership information on each player. Moreover, the example in FIG. 13 shows a case where music score data QD and music data MD are provided, with a time lag therebetween, in the sub-procedure F5B in the example in FIG. 12. In such a case, as shown in FIG. 13, processing at step S307 is executed in the authentication implementation processing in the example in FIG. 13, instead of steps S305 to S306, compared to the example in FIG. 7.

Specifically, the music distribution system 20, when member authentication has succeeded (step S302: Yes), identifies a requested piece of music (step S304) and then transmits music data MD corresponding to the identified piece of music to the game distribution system 10 (step S307). The game distribution system 10, when member authentication has succeeded (step S204: Yes), identifies music score data QD corresponding to the music data MD (step S205) and transmits the authentication result configured to include the music score data QD to the game machine 3B (step S206).

Incidentally, when the music score data QD and the music data MD are transmitted at the same time in the sub-procedure F5B in the example in FIG. 11, the authentication result may include the music data MD. With the game distribution system 10 interposed, data transmission is performed twice before the music data MD arrives at the game machine 3B, once between the music distribution system 20 and the game distribution system 10, and once between the game distribution system 10 and the game machine 3B. Accordingly, the game distribution system 10 may store appropriate music data MD, such as music data MD once acquired (including music data MD corresponding to a whole piece of music), and may transmit the stored music data MD to the game machine 3B. In other words, transmission of the music data MD between the music distribution system 20 and the game distribution system 10 may be omitted as appropriate. More specifically, steps S304, S307, and the like in the example in FIG. 13 may be omitted as appropriate.

The game machine 3B, when it is determined that the result of the member authentication is authentication success (step S104: Yes), displays the wait screen (not shown) on the monitor MO (step S106). Incidentally, when the music score data QD and the music data MD are transmitted at the same time in the sub-procedure F5B in the example in FIG. 12, a guide on each execution timing may be started through start of displaying the guide screen 50, instead of displaying the wait screen, at step S106. Moreover, when member authentication is performed based on the membership information on the game distribution system 10, the authentication implementation processing according to the second embodiment may also be implemented with similar differences to those in the example in FIG. 13.

Figure 14:
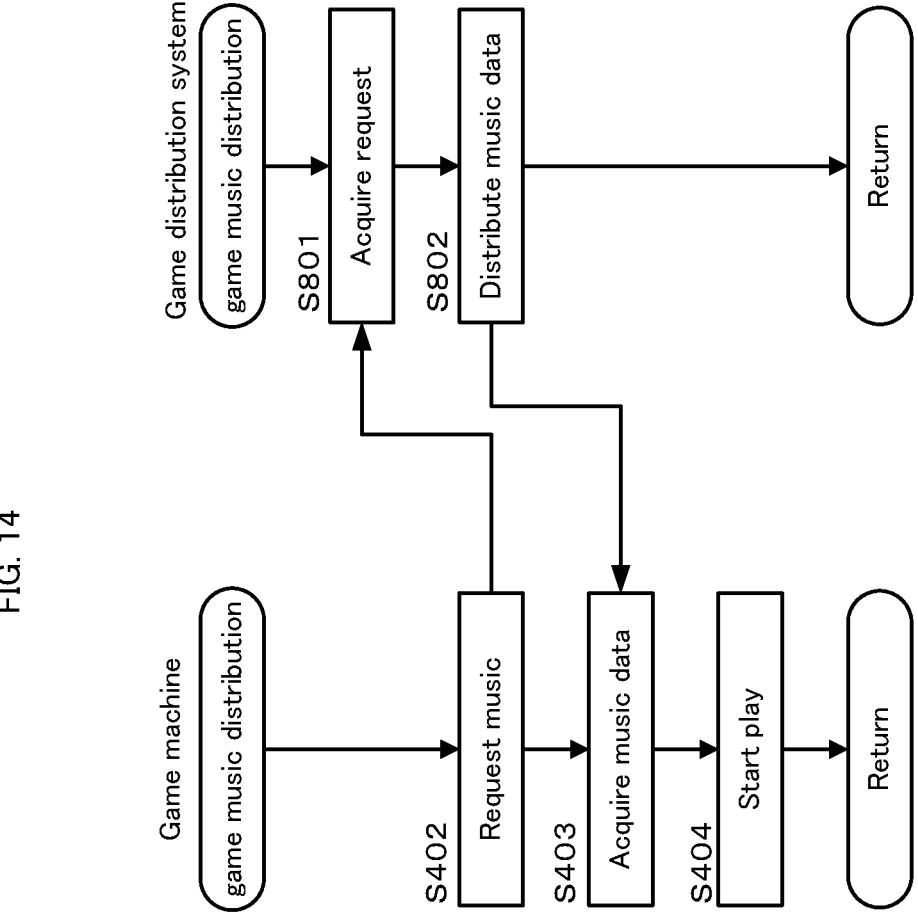
FIG. 14 is a flowchart showing an example of a procedure for game music processing according to the second embodiment.

FIG. 14 is a flowchart showing an example of a procedure for the game music distribution processing according to the second embodiment. The example in FIG. 14 shows a case where music score data QD and music data MD are provided, with a time lag therebetween, in the sub-procedure F5B in the example in FIG. 12, and the wait screen is displayed at step S106 in the example in FIG. 13. In such a case, each time the wait screen is displayed, the game machine 3B starts the game music distribution processing in FIG. 14 and sends a request to distribute a piece of music (step S402). In other words, in the game music distribution processing according to the second embodiment, compared to the example in FIG. 9, the processing at step S401 is omitted. Although the processing at step S402 may be implemented as in the example in FIG. 9, the destination of the request is changed from the music distribution system 20 to the game distribution system 10. In other words, the game machine 3B sends the request to distribute the piece of music (music data MD) to the game distribution system 10, instead of the music distribution system 20.

When the request is sent from the game machine 3B, the game distribution system 10 starts the game music distribution processing in FIG. 14 and acquires the request (step S801). Subsequently, the game distribution system 10 distributes music data MD corresponding to the requested piece of music (step S802) and terminates the current game music distribution processing. The game machine 3B executes steps S403 and S404 as in the example in FIG. 9 and terminates the current game music distribution processing. Incidentally, when a music selection opportunity is provided after member authentication, steps S101 and S205 in the example in FIG. 13 may be omitted, and transmission of the music score data QD at step S206 may also be omitted. In the example in FIG. 14, steps S411 to S412 in the example in FIG. 10 may be executed before step S402, and processing corresponding to steps S511 to S512 may be executed by the game distribution system 10, instead of the music distribution system 20. In the processing at steps S802 and S403, together with the music data MD, music score data QD corresponding to the music data MD may be distributed or acquired.

As described hereinabove, according to the provision procedure according to the second embodiment, operations and advantageous effects approximately similar to those of the provision procedure according to the first embodiment can be achieved. Incidentally, in the provision procedure according to the second embodiment, the server unit 2A for game distribution (or the game distribution database DB1) in the game distribution system 10 functions as the server device, the music score data server, and the music data server in the present invention.

In the provision procedure according to the second embodiment, the opportunity provision device 33 of the game machine 3B functions as the opportunity provision device and the music score acquisition device in the present invention by executing the procedure in the example in FIG. 13. Specifically, the opportunity provision device 33 functions as the opportunity provision device and the music score acquisition device by executing step S101 and step S103 in FIG. 13, respectively. Moreover, the opportunity provision device 33 of the game machine 3B functions as the music acquisition device in the present invention by executing step S403 of the procedure in FIG. 14. On the other hand, the authentication implementation device 13 of the game distribution system 10 functions as a result acquisition device and a data acquisition device in the present invention by executing the procedure in FIG. 13. Specifically, the authentication implementation device 13 functions as the result acquisition device and the data acquisition device by executing step S201 and step S203 when authentication has succeeded in FIG. 13, respectively. Moreover, the authentication implementation device 13 of the game distribution system 10 functions as a member authentication device in the present invention by executing step S202 of the procedure in FIG. 13.

Third Embodiment

Figure 15:
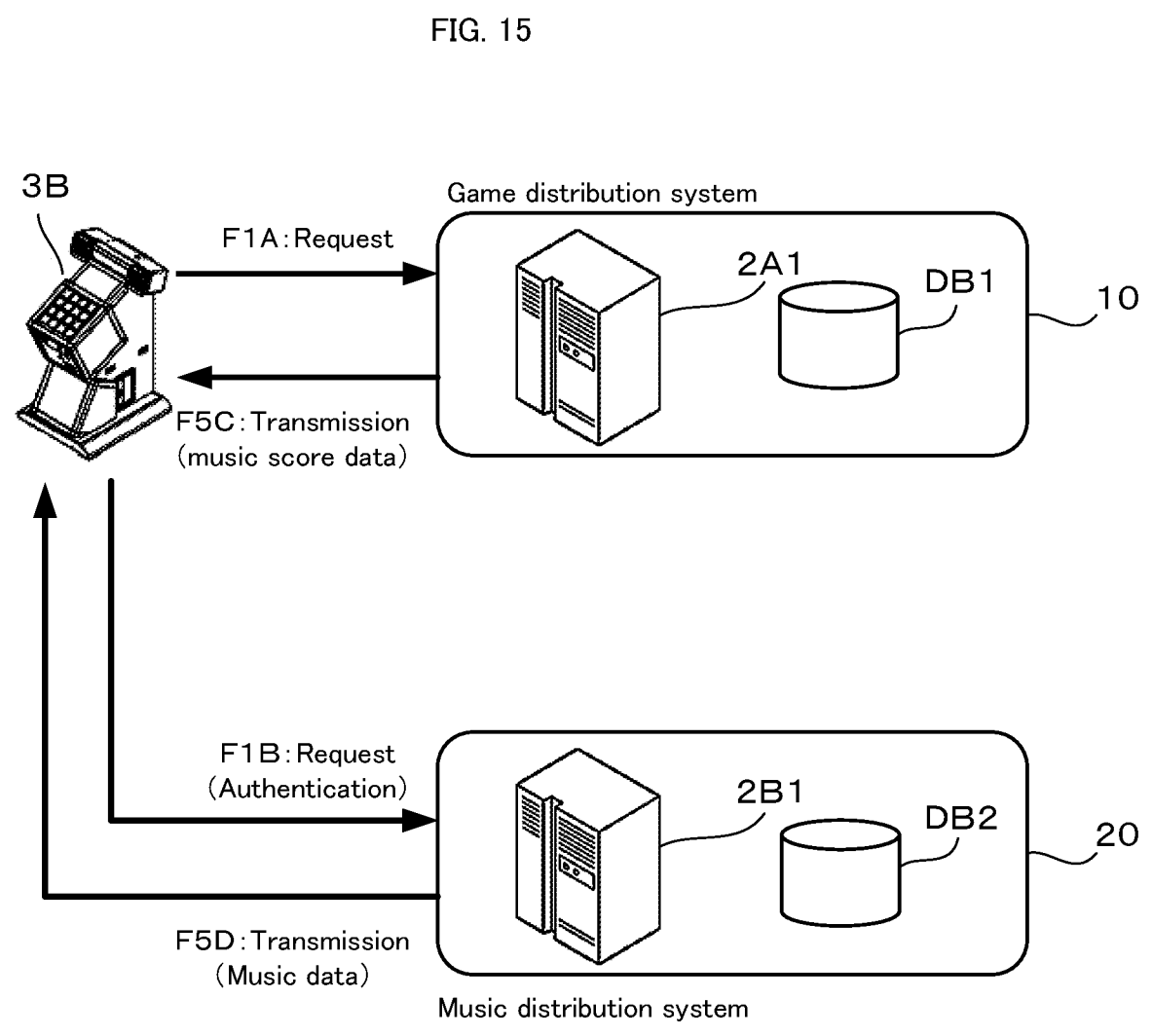

A provision procedure according to a third embodiment is described with reference to FIGS. 15 to 17. FIG. 15 is an explanatory diagram for describing a flow of the music game service in the provision procedure according to the third embodiment. The provision procedure according to the third embodiment is a type of procedure in which no game distribution system is interposed between the game machine 3B and the music distribution system 20 either in member authentication required to use the music distribution service or in provision of music data MD to the game machine 3B. In the provision procedure according to the third embodiment, the game machine 3B directly accesses the music distribution system 20, goes through member authentication, and acquires music data MD. In other words, in the provision procedure according to the third embodiment, the game machine 3B accesses the game distribution system 10 to acquire music score data QD and accesses the music distribution system 20 to acquire music data MD individually.

As shown in FIG. 15, in the provision procedure according to the third embodiment, compared to the provision procedure according to the first embodiment, the sub-procedure F1 includes sub-procedures F1A and F1B. Similarly, in the provision procedure according to the third embodiment, compared to the provision procedure according to the first embodiment, the sub-procedure F5 includes sub-procedures F5C and F5D. On the other hand, in the provision procedure according to the third embodiment, compared to the provision procedure according to the first embodiment, the sub-procedures F2 to F4 and F6 to F7 are omitted. Specifically, in the provision procedure according to the third embodiment, the game machine 3B sends a request to the game distribution system 10 (F1A) as in the provision procedure according to the first embodiment, but what is sought by the request is music score data QD. Accordingly, transmission of authentication-related information such as membership information (and information related to a request for music data MD) is omitted. When the game distribution system 10 acquires the request, the game distribution system 10 transmits the requested music score data QD to the game machine 3B (F5C). The transmission does not include address information or information related to music data MD.

In the provision procedure according to the third embodiment, unlike the provision procedure according to the first embodiment, the game machine 3B separately sends a request to distribute a piece of music to the music distribution system 20 (F1B). The request includes authentication-related information such as membership information. When the music distribution system 20 acquires the request, the music distribution system 20, after member authentication based on the membership information included in the request, transmits music data MD sought by the request to the game machine 3B (F5D). As described above, in the provision procedure according to the third embodiment, the sub-procedure F1 is executed by each of the game distribution system 10 and the music distribution system 20 independently of each other. Then, the music score data QD and the music data MD are separately transmitted to the game machine 3B from the game distribution system 10 and the music distribution system 20, respectively. Incidentally, in the example in FIG. 15, the sub-procedures F1A and F1B may be executed with a time lag therebetween, or may be executed in parallel. In any case, the game machine 3B acquires both the music score data QD and the music data MD and starts play of the music game.

Next, authentication implementation processing and music score transmission processing according to the third embodiment are described. In the following, processing in common with the authentication implementation processing according to the first embodiment or the authentication implementation processing according to the second embodiment is denoted by the same step numbers, and a description thereof is omitted.

Figure 16:
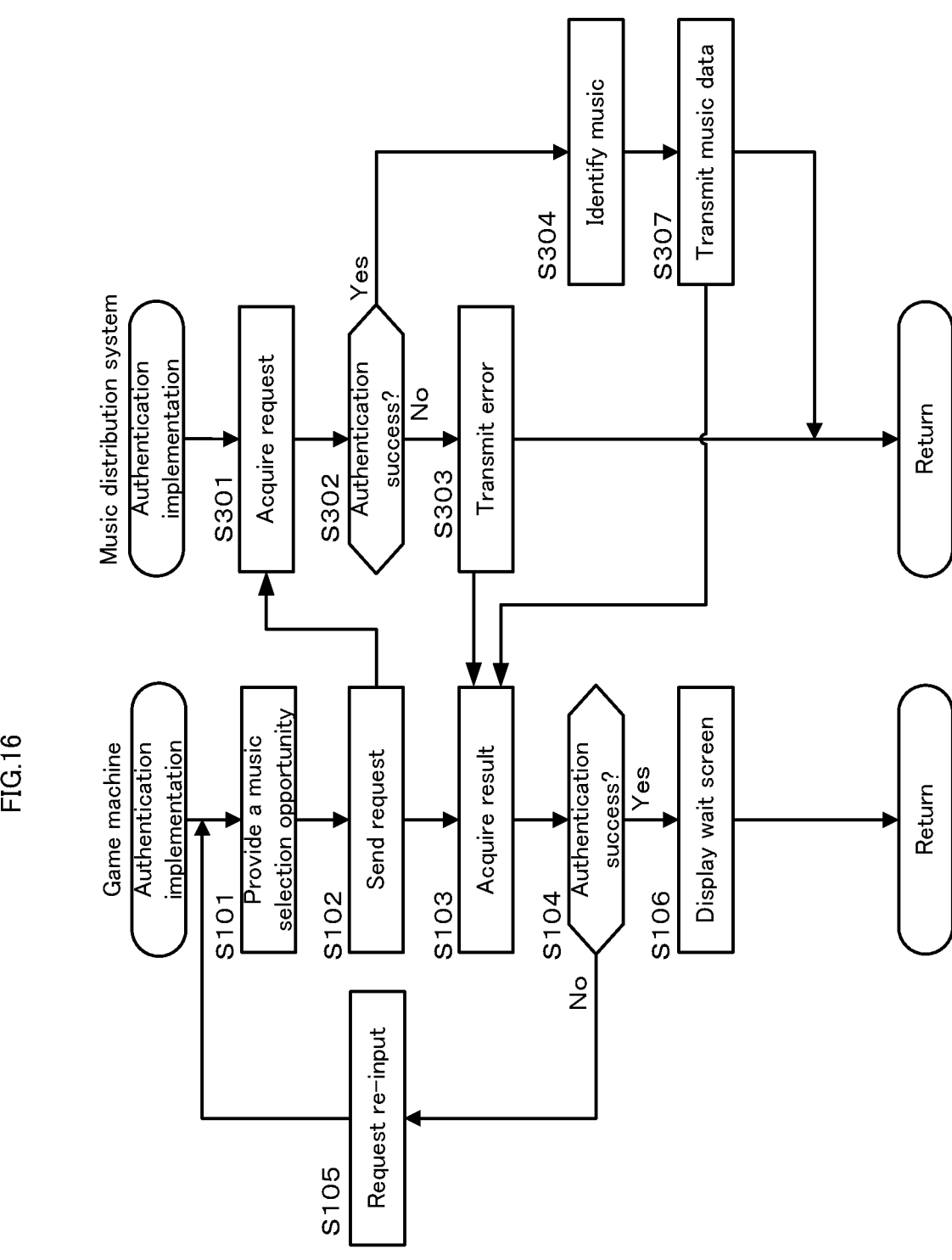
FIG. 16 is a flowchart showing an example of a procedure for authentication implementation processing according to the third embodiment.

FIG. 16 is a flowchart showing an example of a procedure for the authentication implementation processing according to the third embodiment. In the provision procedure according to the third embodiment, since the game distribution system 10 is not involved in member authentication, member authentication is performed based on the membership information on a player. In such a case, although it is preferable that each player be a member, membership information specifically for use of the music game service, such as membership information given to a predetermined facility or each game machine 3B, may be used in member authentication. In such a case, as shown in FIG. 16, in the authentication implementation processing according to the third embodiment, although the game machine 3B sends a request as in the example in FIG. 14, the destination to which the request is sent is not the game distribution system but the music distribution system 20 (step S102).

Similarly, although the music distribution system 20 transmits an error (step S303) and transmits music data MD (S307) as in the example in FIG. 14, the destination is not the game distribution system 10 but the game machine 3B. When the game machine 3B receives an authentication result such as an error from the music distribution system 20 (step S103), the game machine 3B thereafter executes similar processing to the example in FIG. 14 (steps S104 to S106).

The music score transmission processing is processing for transmitting music score data QD required to play the music game from the game distribution system to the game machine 3B. For example, when a piece of music for play is selected at a music selection opportunity and use of the music game service is requested, the game machine 3B starts the music score transmission processing in FIG. 17 simultaneously with sending the request to the music distribution system 20 (step S102 in FIG. 16) and first sends a request for music score data QD corresponding to the piece of music selected at the music selection opportunity to the game distribution system 10 (step S901).

When the request is sent from the game machine 3B, the game distribution system 10 starts the music score transmission processing in FIG. 17 and first acquires the request (step S1001). Subsequently, the game distribution system 10 identifies the music score data QD sought by the request (step S1002). Moreover, the game distribution system 10 transmits the identified music score data QD to the game machine 3B (step S1003). After the transmission, the game distribution system 10 terminates the current music score transmission processing.

When the music score data QD is transmitted from the game distribution system 10, the game machine 3B acquires the music score data QD (step S902). Subsequently, the game machine 3B stores the acquired music score data QD in the storage unit 32, for use in the music game such as for giving a guide on each execution timing in rhythm with the piece of music (step S903). After the storage, the game machine 3B terminates the current music score transmission processing. Thus, the music score data QD required to play the music game is provided from the game distribution system 10. More specifically, for example, when a piece of music that is distributed in the music distribution service is selected as a piece of music for play, music score data QD corresponding to the piece of music is provided from the game distribution system 10.

Incidentally, when a music selection opportunity is provided after member authentication, the processing at step S304 may be omitted in the example in FIG. 16. Moreover, in the processing at step S307, an authentication result indicating authentication success, instead of the music data MD, may be transmitted to the game machine 3B. Further, the wait screen displayed in the processing at step S106 may function not as a game screen that waits for play to be started but as a game screen that waits for a music selection opportunity to be provided. Then, when an appropriate operation that requests a music selection opportunity is performed, the game music distribution processing in the example in FIG. 10 may be provided. However, in such a case, the processing at step S401 in the example in FIG. 10 may be omitted.

As described hereinabove, according to the provision procedure of the third embodiment, operations and advantageous effects approximately similar to those of the provision procedure according to the first embodiment can be achieved. Incidentally, in the provision procedure according to the third embodiment, the server unit 2A for game distribution (or the game distribution database DB1) in the game distribution system 10 functions as the server device and the music score data server in the present invention. On the other hand, the server unit 2B for music distribution (or the database DB2 for music distribution) in the music distribution system 20 functions as the music distribution server and the music data server in the present invention.

In the provision procedure according to the third embodiment, the opportunity provision device 33 of the game machine 3B functions as the opportunity provision device and the music acquisition device in the present invention by executing the procedure in the example in FIG. 16. Specifically, the opportunity provision device 33 functions as the opportunity provision device and the music acquisition device by executing step S101 and step S103 in FIG. 16, respectively. Moreover, the opportunity provision device 33 of the game machine 3B functions as the music score acquisition device in the present invention by executing step S902 of the procedure in FIG. 17.

The present invention is not limited to each embodiment described above and may be implemented as embodiments in which various modifications or changes are made. For example, in the music game service, the game machine 3B acquires music data MD corresponding to each piece of music in the music distribution service via the music distribution system 20. However, data provided to the game machine 3B via the music distribution system 20 is not limited to music data MD. Various data managed by the music distribution system 20 may be distributed to the game machine 3B as appropriate. For example, such data may include various staging information, such as information on an artist who is a player or the like of each piece of music, lyric information (lyric data), or a cover image for each piece of music (generally, when each piece of music is released in an album or the like, the cover image is an image put on the album; however, the image may be any of various images for staging each piece of music or an artist thereof). Alternatively, such data may be provided to the game machine 3B via the game distribution system 10.

In the above-described embodiments, the game distribution system 10 functions as the game system of the present invention by executing the procedure in FIG. 7 or the like. The whole role (various processing and the like), or part thereof, of the game distribution system 10 may be performed by another system (or device), such as a game machine 3 or a user terminal device 4, as appropriate. In other words, the game system of the present invention may include various other systems as appropriate. Moreover, the game distribution system 10 may perform the whole role, or part thereof, of the music distribution system 20 as appropriate. In other words, the music distribution system 20 may be omitted. Consequently, only the game distribution system 10 (or the server unit 2A for the game distribution system included therein) may function as the game system of the present invention, or only any other appropriate system, such as a game machine 3 or a user terminal device 4, may function as the game system of the present invention.

Various aspects of the present invention derived from each of the above-described embodiments and modifications are described below. Incidentally, in the following description, although corresponding members depicted in the accompanying drawings are added in parentheses in order to facilitate the understanding of each aspect of the present invention, such addition is not intended to limit the present invention to the depicted forms.

The game machine of the present invention is a game machine (3) comprising a computer (31) that provides a game in which, based on music score data (QD) describing each execution timing at which a play action of a user is to be executed, a guide on each execution timing is given in rhythm with a piece of music for play and timings of actual play actions executed by the user are judged, wherein the computer serves as: an opportunity provision device (33) configured to provide a music selection opportunity for selecting the piece of music for play in such a manner that a plurality of pieces of music in a music distribution service is included as options, the music distribution service provided separately from the game as a service of distributing the plurality of pieces of music exclusively to a user terminal device (4) after member authentication using a member ID unique to each member; a music score acquisition device (33) connected to a music score data server (2A) via a network (NT) and configured to acquire music score data for play from the music score data server, the music score data server storing the music score data for play as music score data corresponding to the piece of music for play, among a plurality of pieces of the music score data prepared in such a manner as to correspond to the plurality of pieces of music, respectively, as the music score data corresponding to each piece of music; and a music acquisition device (33) connected to a music data server (2A, 2B) via the network (NT) and configured to acquire music data for play from the music data server such that giving of the guide on each execution timing in rhythm with the piece of music for play and judgement are performed based on a combination of the music data for play and the music score data for play, the music data server storing the music data for play as music data corresponding to the piece of music for play, among a plurality of pieces of the music data (MD) for reproducing the plurality of piece of music, respectively.

According to the game machine of the present invention, a music selection opportunity is provided that includes, as options, a plurality of pieces of music prepared in the music distribution service provided exclusively to a user terminal device that has gone through member authentication, and music score data and music data corresponding to a piece of music for play selected at the music selection opportunity are acquired from the music score data server and the music data server, respectively. The music score data acquired from the music score data server and the music data acquired from the music data server are used in such a manner that giving of a guide on each execution timing in rhythm with the piece of music for play and the like are performed based on a combination of the music score data and the music data. In other words, each piece of music in the music distribution service is utilized for a piece of music for play. Thus, each piece of music prepared in the music distribution service provided exclusively to members can be utilized in game play.

The game system of the present invention is a game system (10), comprising a server device (2A) connected to the game machine described above via a network (NT), wherein the server device is configured to function as the music score data server. According to the game system of the present invention, the server device functions as the music score data server connected to the game machine described above. Thus, it is possible to assist in implementing the game machine of the present invention.

When the server device in the game system functions as the music score data server, the music distribution service may be provided by the game system, or may be provided by a different system from the game system. In other words, the music distribution service and the game may be provided by the same operator, or may be provided by different operators. For example, in an aspect of the game system of the present invention, the server device may be connected to a music distribution system (20) via the network (NT), the music distribution system constructed as a different system from the server device in such a manner as to include a music distribution server (2B) that stores the plurality of pieces of music data to provide the music distribution service to each member, and any one of the server device and the music distribution server may function as the music data server. In such a case, the music distribution service provided by the music distribution system constructed as a different system can be utilized in the game. Moreover, an operator of the game machine can entrust individual negotiation on each piece of music for use thereof to an operator of the music distribution system, and can conduct comprehensive negotiation on use of each piece of music with the operator of the music distribution system. Thus, time and efforts can be reduced when many pieces of music are used in the game. Since a new piece of music can be introduced earlier as a result, interest of the game can be enhanced as a further result.

When the music distribution service is provided by the music distribution system, the member authentication to use the music distribution service may be performed directly between the game machine and the music distribution system, or may be performed indirectly via the server device in the game system. For example, in an aspect where the music distribution service is provided by the music distribution system, the music acquisition device, when the music distribution server functions as the music data server, may be configured to acquire the music data for play after the member authentication by transmitting, to the music distribution server, authentication information provided by the user in such a manner as to include information on the member ID as information for the member authentication. Alternatively, the server device may include an ID acquisition device (13) configured to acquire, via the game machine, authentication information provided by the user in such a manner as to include information on the member ID as information for the member authentication, and an authentication provision device (13) configured to provide the authentication information to the music distribution server for the member authentication, and the music acquisition device may be configured to acquire the music data for play after the member authentication based on the authentication information.

When the member authentication to use the music distribution service is performed indirectly via the server device in the game system, input of the authentication information may be performed each time, or may be omitted as appropriate. For example, in an aspect where the member authentication to use the music distribution service is performed via the server device in the game system, the game may be played while each user is identified based on user identification information given as information for identifying each user separately from the member ID, the server device may include a data generation device (13) configured to, when the user identification information and the authentication information are provided from the user, generate authentication information data (AD) that associates the user identification information and the authentication information, and the ID acquisition device may be configured to acquire the user identification information on the user, instead of the authentication information, such that the authentication information is acquired based on the authentication information data after the authentication information data is generated.

The member authentication to use the music distribution service may be implemented based on various authentication information. For example, when the user of the game machine is a member of the music distribution service, the member authentication may be implemented based on the authentication information on the user. Alternatively, various persons other than the user, such as the operator of the game machine and the operator of the server device, or various things, such as the game machine and the server device, may function as members of the music distribution service, and the member authentication may be implemented based on authentication information on such persons and things. Specifically, for example, in an aspect where the member authentication to use the music distribution service is performed indirectly via the server device in the game system of the present invention, the server device may include a member authentication device (13) configured to perform the member authentication with the music distribution server, based on a special member ID as the member ID given to the server device in order for the server device to function as a member of the music distribution system, and the music acquisition device may be configured to acquire the music data for play after the member authentication based on the special member ID. In such a case, each piece of music in the music distribution service can be utilized in the game, irrespective of whether or not the user of the game machine is a member of the music distribution service.

When the music distribution service is provided by the music distribution system, any one of the music distribution server included in the music distribution system and the server device in the game system may function as the music data server. For example, in an aspect where the music distribution service is provided by the music distribution system, the server device, when the server device functions as the music data server, may include a result acquisition device (13) configured to acquire, via the game machine, a result of selection at the music selection opportunity, and a data acquisition device (13) configured to acquire, based on the result of selection at the music selection opportunity, the music data for play from the music distribution server after the member authentication.

When the music distribution server functions as the music data server, the music data may be provided to the game machine in various ways. For example, the music data may be provided directly from the music distribution server to the game machine. For example, when the member authentication is performed via the server device in the game system, various indirect information for acquiring the music data from the music distribution server may be provided from the server device in the game system to the game machine, and the game machine may acquire the music data from the music distribution server via the indirect information. For example, in an aspect where the member authentication is performed via the server device in the game system, when the music distribution server functions as the music data server, the server device may include an information provision device (13) configured to provide access information for accessing the music data server to the game machine after the member authentication, and the music acquisition device may be configured to access the music data server based on the access information and acquire the music data for play.

Various functions included in the music distribution service may be used in the game as appropriate. For example, in an aspect where the music distribution service is provided by the music distribution system, when a pickup list is prepared in the music distribution system as any one of a play list and a preference list, the play list storing each piece of music picked up by each member from the plurality of pieces of music, the preference list storing each piece of music picked up based on a preference of each member according to a distribution record of each member, the game machine may include a list acquisition device (33) configured to acquire the pickup list via the music distribution system such that each piece of music included in the pickup list is included as the options at the music selection opportunity. In such a case, each piece of music picked up beforehand through the music distribution service can be used for a candidate for the piece of music for play. Thus, at the music selection opportunity, it is possible to allow the user to select a preferred piece of music as the piece of music for play more quickly and easily.

The non-transitory computer readable storage medium of the present invention is a non-transitory computer readable storage medium storing a computer program (PG3) configured to cause a computer (31) to function as each device of the game machine described above.

The control method of the present invention is a control method executed by a computer (31) incorporated in a game machine (3) that provides a game in which, based on music score data (QD) describing each execution timing at which a play action of a user is to be executed, a guide on each execution timing is given in rhythm with a piece of music for play and timings of actual play actions executed by the user are judged, wherein the control method comprises: an opportunity provision procedure that provides a music selection opportunity for selecting the piece of music for play in such a manner that a plurality of pieces of music in a music distribution service is included as options, the music distribution service provided separately from the game as a service of distributing the plurality of pieces of music exclusively to a user terminal device (4) after member authentication using a member ID unique to each member; a music score acquisition procedure that is connected to a music score data server (2A) via a network (NT) and acquires music score data for play from the music score data server, the music score data server storing the music score data for play as music score data corresponding to the piece of music for play, among a plurality of pieces of the music score data prepared in such a manner as to correspond to the plurality of pieces of music, respectively, as the music score data corresponding to each piece of music; and a music acquisition procedure that is connected to a music data server (2B) via the network (NT) and acquires music data for play from the music data server such that giving of the guide on each execution timing in rhythm with the piece of music for play and judgement are performed based on a combination of the music data for play and the music score data for play, the music data server storing the music data for play as music data corresponding to the piece of music for play, among a plurality of pieces of the music data (MD) for reproducing the plurality of piece of music, respectively. The game machine of the present invention can be implemented by executing the computer program or the control method of the present invention.

Alternatively, the non-transitory computer readable storage medium of the present invention is a non-transitory computer readable storage medium storing a computer program (PG1) configured to cause a computer (11) incorporated in the server device to function as each device of the game system described above. The game system of the present invention can be implemented by executing the computer program of the present invention.

The invention claimed is:

1. A game machine comprising a computer that provides a game in which, based on music score data describing each execution timing at which a play action of a user is to be executed, a guide on each execution timing is given in rhythm with a piece of music with which to play the game and timings of actual play actions executed by the user are judged, wherein the computer serves as:

an opportunity provision device configured to provide a music selection opportunity for selecting the piece of music with which to play the game in such a manner that a plurality of pieces of music in a music distribution service is included as options for selecting the piece of music with which to play the game, the music distribution service provided separately from the game as a service of distributing the plurality of pieces of music exclusively to a user terminal device after member authentication using a member ID unique to each member;

a music score acquisition device connected to a music score data server via a network and configured to acquire music score data that corresponds to the selected piece of music and that is used to play the game from the music score data server, the music score data server storing the music score data corresponding to the selected piece of music, among a plurality of pieces of the music score data prepared in such a manner as to correspond to the plurality of pieces of music, respectively, as the music score data corresponding to each piece of music; and a music acquisition device connected to a music data server via the network and configured to acquire music data with which to play the game from the music data server such that giving of the guide on each execution timing in rhythm with the selected piece of music and judgement are performed based on a combination of the acquired music data that corresponds to the selected piece of music and the acquired music score data that corresponds to the selected piece of music, the music data server storing the music data corresponding to the selected piece of music, among a plurality of pieces of the music data for reproducing the plurality of piece of music, respectively.

2. A game system, comprising a server device connected to the game machine of claim 1 via a network, wherein the server device is configured to function as the music score data server.

3. The game system of claim 2, wherein the server device is connected to a music distribution system via the network, the music distribution system constructed as a different system from the server device in such a manner as to include a music distribution server that stores the plurality of pieces of music data to provide the music distribution service to each member, and any one of the server device and the music distribution server functions as the music data server.

4. The game system of claim 3, wherein the music acquisition device, when the music distribution server functions as the music data server, is configured to acquire the music data that corresponds to the selected piece of music after the member authentication by transmitting, to the music distribution server, authentication information provided by the user in such a manner as to include information on the member ID as information for the member authentication.

5. The game system of claim 4, wherein when the music distribution server functions as the music data server, the server device includes an information provision device configured to provide access information for accessing the music data server to the game machine after the member authentication, and the music acquisition device is configured to access the music data server based on the access information and acquire the music data that corresponds to the selected piece of music.

6. The game system of claim 3, wherein the server device includes an ID acquisition device configured to acquire, via the game machine, authentication information provided by the user in such a manner as to include information on the member ID as information for the member authentication, and an authentication provision device configured to provide the authentication information to the music distribution server for the member authentication, and the music acquisition device is configured to acquire the music data that corresponds to the selected piece of music after the member authentication based on the authentication information.

7. The game system of claim 6, wherein the game is played while each user is identified based on user identification information given as information for identifying each user separately from the member ID, the server device includes a data generation device configured to, when the user identification information and the authentication information are provided from the user, generate authentication information data that associates the user identification information and the authentication information, and the ID acquisition device is configured to acquire the user identification information on the user, instead of the authentication information, such that the authentication information is acquired based on the authentication information data after the authentication information data is generated.

8. The game system of claim 6, wherein the server device, when the server device functions as the music data server, includes a result acquisition device configured to acquire, via the game machine, a result of selection at the music selection opportunity, and a data acquisition device configured to acquire, based on the result of selection at the music selection opportunity, the music data that corresponds to the selected piece of music from the music distribution server after the member authentication.

9. The game system of claim 3, wherein the server device includes a member authentication device configured to perform the member authentication with the music distribution server, based on a special member ID as the member ID given to the server device in order for the server device to function as a member of the music distribution system, and the music acquisition device is configured to acquire the music data that corresponds to the selected piece of music after the member authentication based on the special member ID.

10. The game system of claim 3, wherein when a pickup list is prepared in the music distribution system as any one of a play list and a preference list, the play list storing each piece of music picked by each member from the plurality of pieces of music, the preference list storing each piece of music picked based on a preference of each member according to a distribution record of each member, the game machine includes a list acquisition device configured to acquire the pickup list via the music distribution system such that each piece of music included in the pickup list is included as the options at the music selection opportunity.

11. A non-transitory computer readable storage medium storing a computer program configured to cause a computer to function as;

an opportunity provision device configured to provide a music selection opportunity for selecting a piece of music with which to play a game in such a manner that a plurality of pieces of music in a music distribution service is included as options for selecting the piece of music with which to play the game, the music distribution service provided separately from the game as a service of distributing the plurality of pieces of music exclusively to a user terminal device after member authentication using a member ID unique to each member;

a music score acquisition device connected to a music score data server via a network and configured to acquire music score data that corresponds to the selected piece of music and that is used to play the game from the music score data server, the music score data server storing the music score data corresponding to the selected piece of music with which to play the game, among a plurality of pieces of the music score data prepared in such a manner as to correspond to the plurality of pieces of music, respectively, as the music score data corresponding to each piece of music; and a music acquisition device connected to a music data server via the network and configured to acquire music data with which to play the game from the music data server such that giving of the guide on each execution timing in rhythm with the selected piece of music and judgement are performed based on a combination of the acquired music data that corresponds to the selected piece of music and the acquired music score data that corresponds to the selected piece of music, the music data server storing the music data corresponding to the selected piece of music, among a plurality of pieces of the music data for reproducing the plurality of piece of music, respectively.

12. A non-transitory computer readable storage medium storing a computer program configured to cause a computer incorporated in a server device to function as;

an opportunity provision device configured to provide a music selection opportunity for selecting a piece of music with which to play a game in such a manner that a plurality of pieces of music in a music distribution service is included as options for selecting the piece of music with which to play the game, the music distribution service provided separately from the game as a service of distributing the plurality of pieces of music exclusively to a user terminal device after member authentication using a member ID unique to each member;

a music score acquisition device connected to a music score data server via a network and configured to acquire music score data that corresponds to the selected piece of music and that is used to play the game from the music score data server, the music score data server storing the music score data corresponding to the selected piece of music with which to play the game, among a plurality of pieces of the music score data prepared in such a manner as to correspond to the plurality of pieces of music, respectively, as the music score data corresponding to each piece of music; and a music acquisition device connected to a music data server via the network and configured to acquire music data with which to play the game from the music data server such that giving of the guide on each execution timing in rhythm with the selected piece of music and judgement are performed based on a combination of the acquired music data that corresponds to the selected piece of music and the acquired music score data that corresponds to the selected piece of music, the music data server storing the music data corresponding to the selected piece of music, among a plurality of pieces of the music data for reproducing the plurality of piece of music, respectively, wherein the server device is configured to function as the music score data server.

13. A control method executed by a computer incorporated in a game machine that provides a game in which, based on music score data describing each execution timing at which a play action of a user is to be executed, a guide on each execution timing is given in rhythm with a piece of music with which to play the game and timings of actual play actions executed by the user are judged, wherein the control method comprises:

an opportunity provision procedure that provides a music selection opportunity for selecting the piece of music with which to play the game in such a manner that a plurality of pieces of music in a music distribution service is included as options for selecting the piece of music with which to play the game, the music distribution service provided separately from the game as a service of distributing the plurality of pieces of music exclusively to a user terminal device after member authentication using a member ID unique to each member;

a music score acquisition procedure that is connected to a music score data server via a network and acquires music score data that corresponds to the selected piece of music and that is used to play the game from the music score data server, the music score data server storing the music score data corresponding to the selected piece of music, among a plurality of pieces of the music score data prepared in such a manner as to correspond to the plurality of pieces of music, respectively, as the music score data corresponding to each piece of music; and a music acquisition procedure that is connected to a music data server via the network and acquires music data with which to play the game from the music data server such that giving of the guide on each execution timing in rhythm with the selected piece of music and judgement are performed based on a combination of the acquired music data that corresponds to the selected piece of music and the acquired music score data that corresponds to the selected piece of music, the music data server storing the music data corresponding to the selected piece of music for play, among a plurality of pieces of the music data for reproducing the plurality of piece of music, respectively.

\* \* \* \* \*